US011535160B2

(12) United States Patent
Erickson

(10) Patent No.: US 11,535,160 B2
(45) Date of Patent: Dec. 27, 2022

(54) FALL PROTECTION SYSTEM FOR FLATBED TRAILERS

(71) Applicant: Safety Rail Company, LLC, Spring Park, MN (US)

(72) Inventor: Craig Erickson, Deephaven, MN (US)

(73) Assignee: Safety Rail Company, LLC, Spring Park, MN (US)

( * ) Notice: Subject to any disclaimer, the term of this patent is extended or adjusted under 35 U.S.C. 154(b) by 821 days.

(21) Appl. No.: 16/447,442

(22) Filed: Jun. 20, 2019

(65) Prior Publication Data

US 2019/0389387 A1 Dec. 26, 2019

Related U.S. Application Data

(60) Provisional application No. 62/688,747, filed on Jun. 22, 2018.

(51) Int. Cl.
*B60R 3/00* (2006.01)
*B62D 33/08* (2006.01)
*B62D 33/027* (2006.01)
*B62D 33/02* (2006.01)

(52) U.S. Cl.
CPC .......... *B60R 3/005* (2013.01); *B62D 33/0207* (2013.01); *B62D 33/027* (2013.01); *B62D 33/08* (2013.01)

(58) Field of Classification Search
CPC ............ B62D 33/0207; B62D 33/0222; B62D 33/027; B62D 33/33; B62D 53/06; B62D 53/061; B62D 63/06; B62D 63/08; E04G 21/3223; E04G 5/142; E04G 27/00; B60R 3/005

See application file for complete search history.

(56) References Cited

U.S. PATENT DOCUMENTS

| 4,342,480 A | * | 8/1982 | Ross, Jr. ................. | B60J 7/062 296/105 |
| 5,080,422 A | | 1/1992 | DeMonte et al. | |
| 5,546,972 A | * | 8/1996 | Wardell .................. | B60J 7/062 296/105 |
| 6,045,157 A | | 4/2000 | Poulin | |
| 6,053,281 A | * | 4/2000 | Murray ............... | E04G 21/3223 248/237 |
| 7,510,233 B2 | * | 3/2009 | Bowling .................. | B60P 3/04 296/186.2 |
| 8,366,079 B2 | * | 2/2013 | Stoffels ................. | E01F 13/022 256/65.14 |
| 9,403,486 B2 | | 8/2016 | May | |

(Continued)

FOREIGN PATENT DOCUMENTS

GB 2464469 A1 * 4/2010 ........... B62D 33/027

*Primary Examiner* — Gregory A Blankenship
(74) *Attorney, Agent, or Firm* — Christensen, Fonder, Dardi & Herbert PLLC; Stuart J. Olstad

(57) ABSTRACT

A safety rail system for a flatbed. The system is portable, installs and dismantles in minutes, and is adaptable to any flatbed trailer or truck having post mounting side pockets. The system collapses into a compact package for stowing and transport. The system utilizes existing post mounting side pockets to establish a fence line that supports one or more cable rails. The cable(s) of the cable rails are drawn taut to provide a firm barrier to protect equipment and personnel from falling off the edge of the flatbed.

14 Claims, 14 Drawing Sheets

(56) References Cited

U.S. PATENT DOCUMENTS

| | | | |
|---|---|---|---|
| 9,573,629 B2* | 2/2017 | Conny | B62D 33/0207 |
| 9,731,640 B1* | 8/2017 | Meacham | B60R 3/00 |
| 10,166,906 B1* | 1/2019 | Lau | B60J 5/08 |
| 10,189,510 B1* | 1/2019 | Higgins | B62D 33/0207 |
| 2007/0029838 A1* | 2/2007 | Brennan | B60P 1/26 |
| | | | 296/182.1 |
| 2010/0072780 A1* | 3/2010 | Barna | B62D 33/0207 |
| | | | 280/789 |
| 2019/0389387 A1* | 12/2019 | Erickson | B60R 3/005 |
| 2021/0291915 A1* | 9/2021 | Mazurek | B62D 33/033 |

* cited by examiner

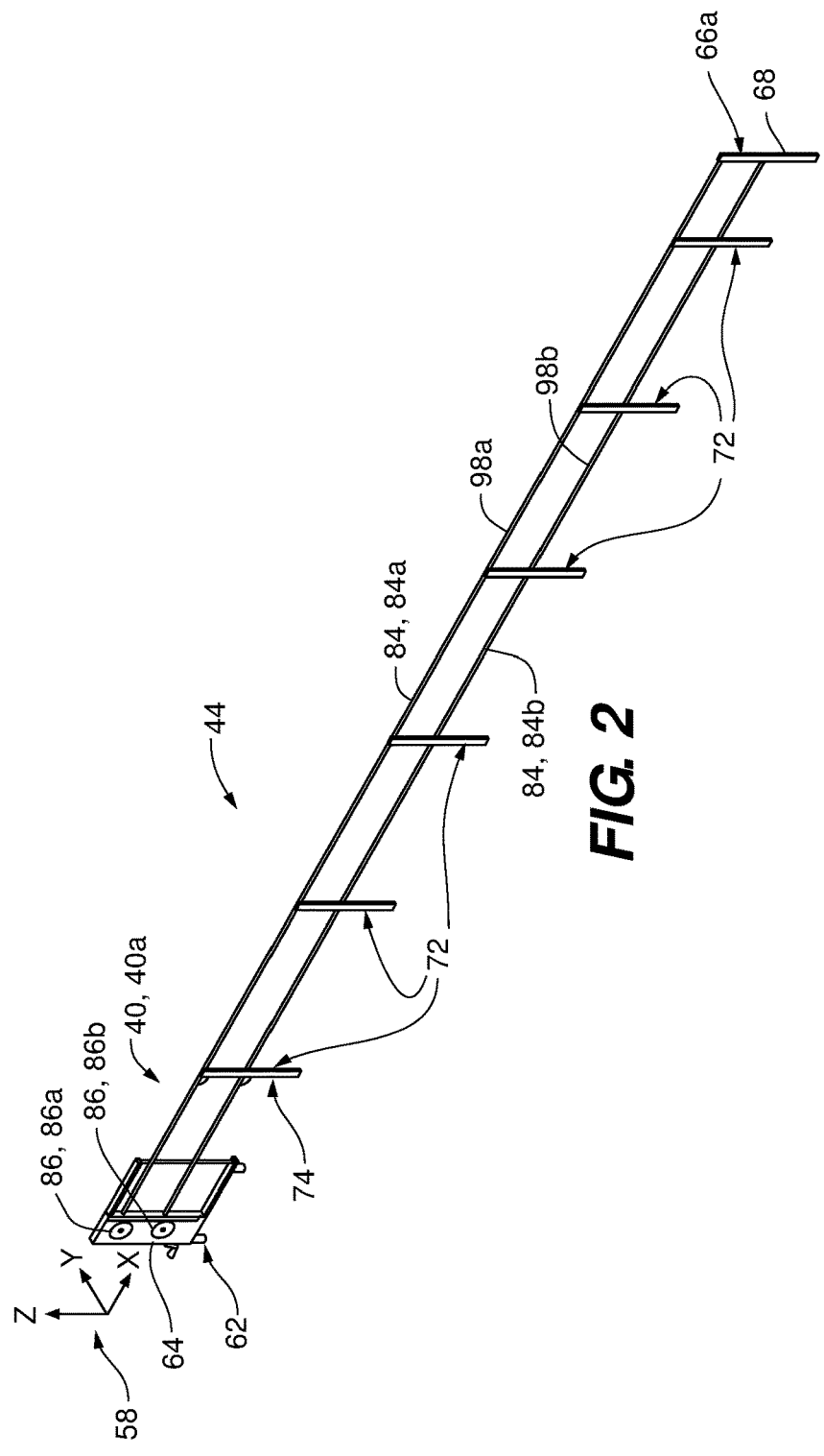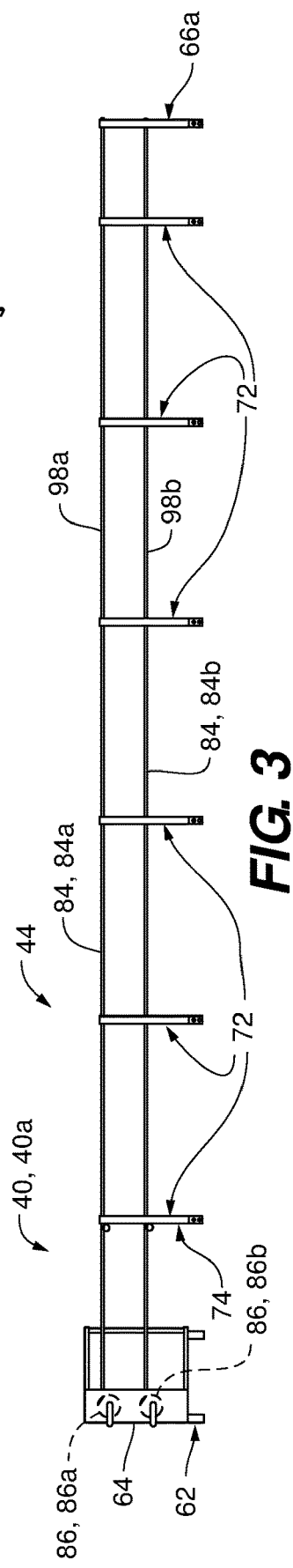

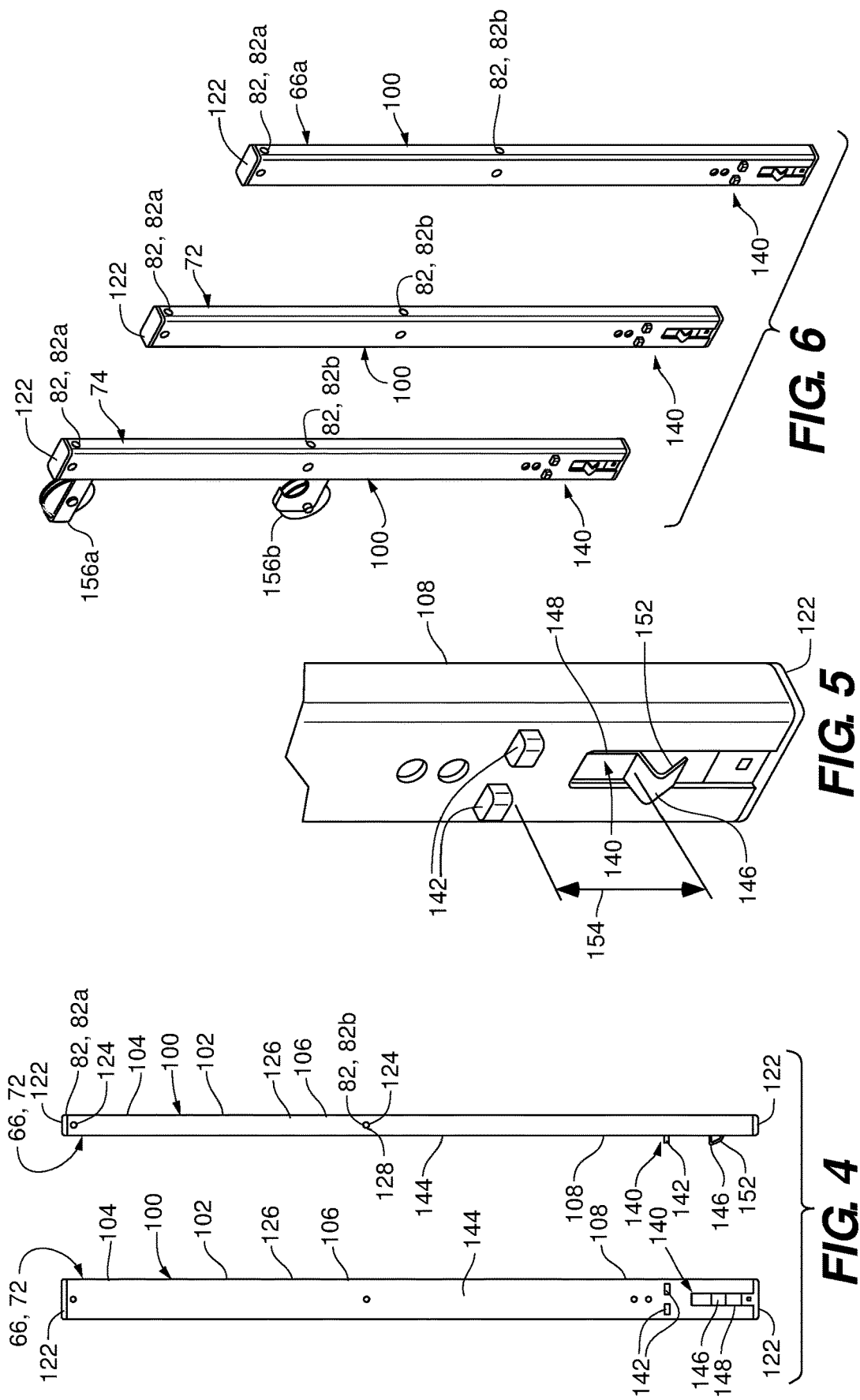

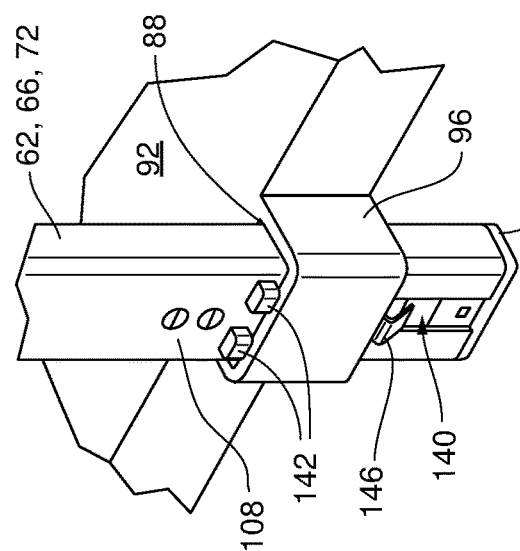
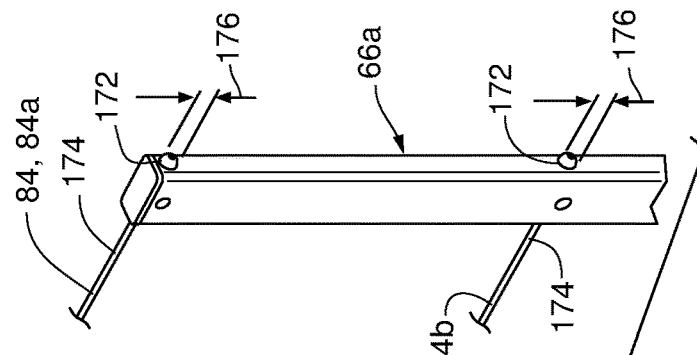
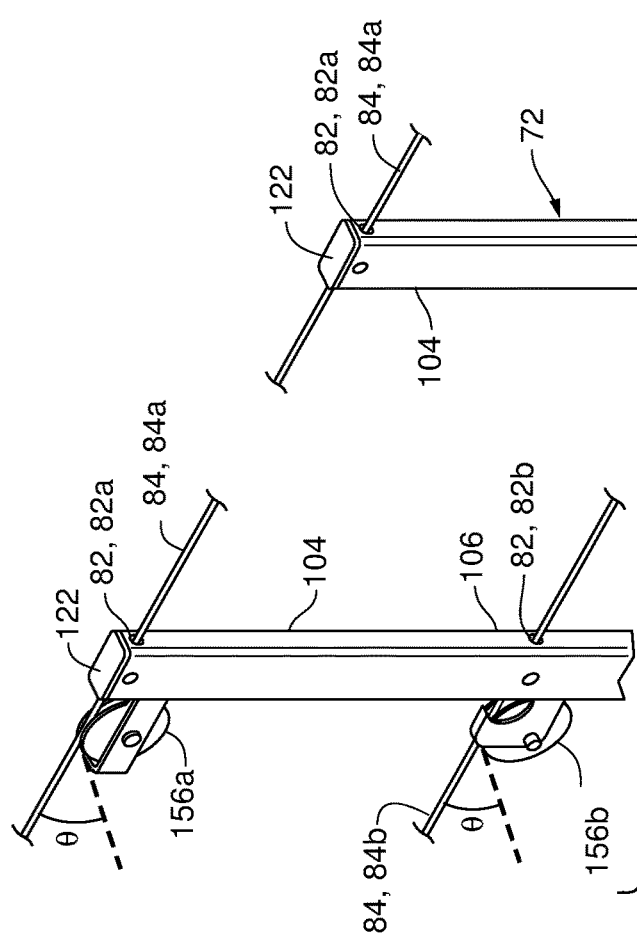

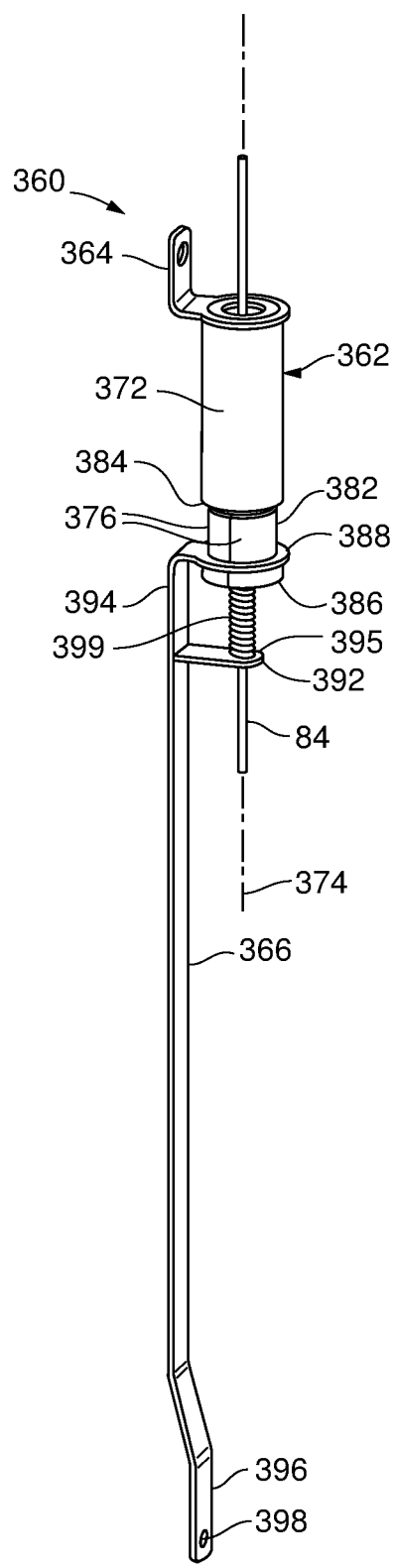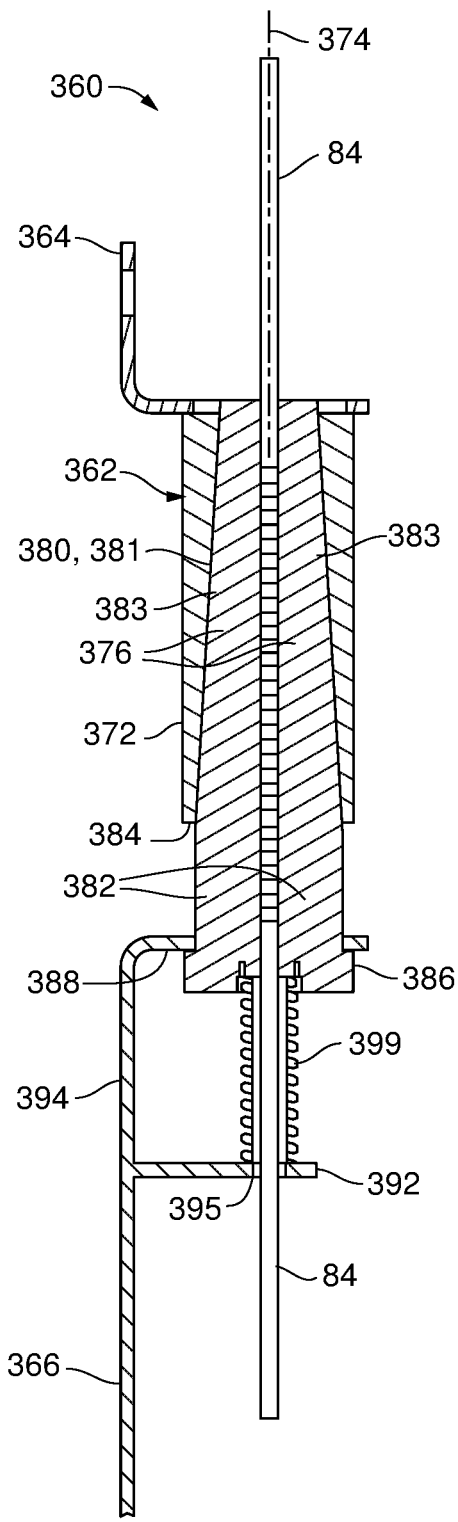
FIG. 26
FIG. 27

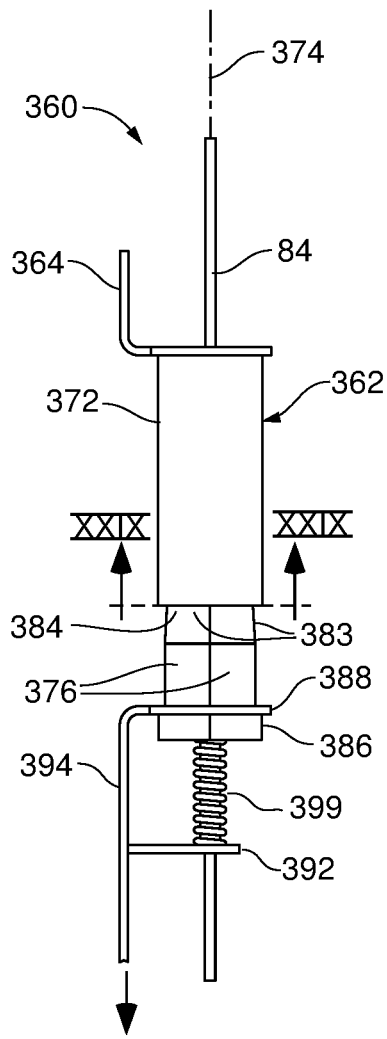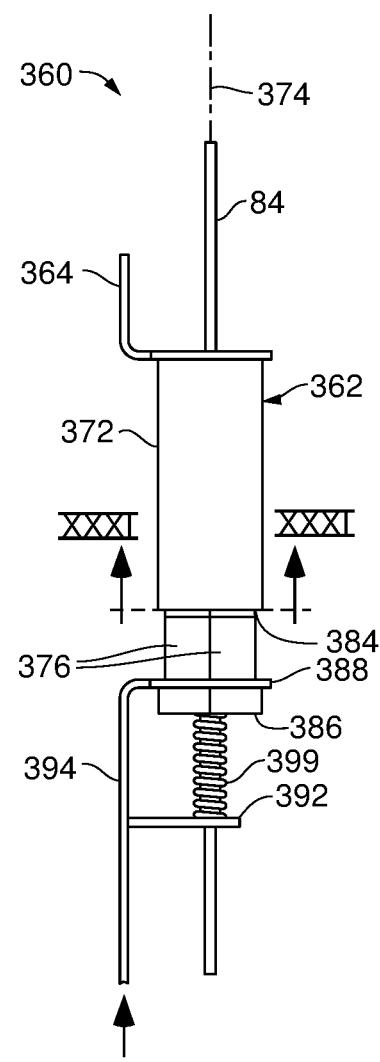
FIG. 28
FIG. 30
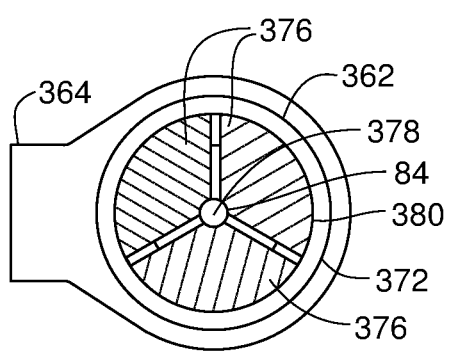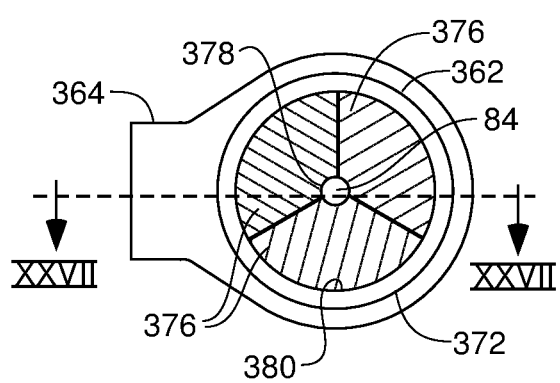
FIG. 29
FIG. 31

FALL PROTECTION SYSTEM FOR FLATBED TRAILERS

RELATED APPLICATION

This application claims the benefit of U.S. Provisional Patent Application No. 62/688,747, filed Jun. 22, 2018, the disclosure of which is incorporated by reference herein in its entirety.

FIELD OF THE DISCLOSURE

This disclosure is directed generally to safety rail systems and more specifically to a retractable, portable cable rail system.

BACKGROUND OF THE DISCLOSURE

Portable safety railings for temporary set up are ubiquitous in various trades and industries, to the point that they are regulated by the Occupational Safety and Health Administration. The use of such safety railings on flatbed trucks is also known. However, in order for safety railings to remain with a flatbed truck, they must be stowed. Standard safety railings are bulky and difficult to stow for many flatbed truck setups. A safety railing system that is portable and readily stowed for use with flatbed trucks would be welcomed.

SUMMARY OF THE DISCLOSURE

A portable safety rail system is disclosed that can be readily installed and deployed along the sides of a flatbed trailer to provide fall protection for personnel while loading or unloading the trailer. The system can be configured in a collapsed or stowed configuration and in an extended or deployed configuration. In the stowed configuration, the components of the safety rail are collapsed into a compact, portable package that can be removed from the flatbed trailer or optionally remain with the flatbed trailer. The system can be retrofitted to any flatbed that has side pockets along the perimeter, such side pockets being common among flatbed trailers. In the stowed configuration, the portable safety rail can be handled manually and installed and removed by one or two people. In the deployed configuration, the system provides a strong and stable barrier that prevents personnel or objects from falling off the sides of the flatbed trailer.

A safety rail system for flatbed trucks is disclosed at U.S. Pat. No. 9,573,629 to Conny ("Conny"). The safety rail system of Conny includes posts that are outfitted with track mounted post holder assemblies that include grooved wheels (akin to pulleys) to secure the post and holder to the top of the tracks for deployment and retraction. While the post assemblies are retractable, the rails are not retractable and extend the length of the safety rail system along a side of the flat bed. In addition to the complexity of track and post holder assemblies, the system is permanently installed on the flatbed, and is not portable.

The safety rail systems disclosed herein are indeed portable. While the disclosed systems can remain with the flatbed, they can also be removed for use with other flatbeds. The portability and adaptability of the systems enables the disclosed safety rail systems to be used in a variety of settings. For example, system may be made available at a loading dock or yard where loading and unloading of uncovered flatbed trailers is commonplace. The system is temporarily mounted to the flatbed trailer, then removed when the loading or unloading task is complete and remains with the loading dock or yard. In another example, a trucking company may obtain a number of the disclosed safety rail systems which can be shared among flatbed trailers that are in current use. The portable and compact aspects enable the disclosed systems to be removed and stored away safely and out of inclement weather.

The portable safety rail system generally comprises a plurality of posts that suspend cables that serve as railings. The system takes advantage of side pockets that are present along the edges of all standard flatbed trailers for mounting the posts of the system. The side pockets typically run at intervals down the length of both sides of standard flatbed trailers. The system utilizes these existing side pockets to secure the posts in the deployed configuration as well as to mount a storage frame onto the flatbed trailer that houses the posts in the compact arrangement of the retracted configuration. To deploy, the posts of the system are removed from the storage frame and inserted in the side pockets. As the posts are positioned along the length of the trailer, a barrier is created which acts as the fall protection. The cable is pulled tight and locked to secure the barrier. Because the system utilizes the side pockets to secure the posts, there is no need for bulky base supports at the bottom of the posts, so that the posts may be side stacked against each other in a compact and stable arrangement.

The disclosed safety rail system is also flexible. For example, if a flatbed is to be accessed or unloaded from one side instead of the rear, the system could be erected on the opposing side and around the end of the flatbed. Once the system is deployed, fall protection is enabled by cables and posts along the length of the trailer. The system is intended to be compact and not interfere with the space required by the load being transported on the trailer. The system can be installed on a temporary basis or left in place during transport.

The storage frame houses one or two retractable cable reels. One reel is used if a single cable is used for the upper and lower fall restraint. Two reels are used if there are separate cables for the upper fall restraint and the lower fall restraint, one for each cable. The cable reel(s) unspool and spool the cable(s) as the system is deployed and retracted. Cable tensioning and locking mechanisms may be built into the cable reel(s) or be separate from the cable reel(s). The tensioning and locking mechanisms enable the tightening of the cable(s) once the system is deployed, and also holds the cable(s) in a locked position to hold the cable(s) tight during both deployment and storage.

Each post assembly is shaped to fit in existing side pockets on a flatbed trailer. Each post assembly has an adjustable locking spring designed to retain the post in the trailer side pocket. An adjustment on the locking spring enables adaptation to various pocket depths. The shape of the post assemblies is designed to match the shape of the side pocket on the trailer. The design of the post can be sized to match the various sizes of the side pockets on different trailer designs. The posts are easily inserted into the side pockets for quick set-up, and easily removed from the side pockets for quick removal.

Structurally, various embodiments of the disclosure include a safety rail for a flatbed trailer, comprising a proximal end post assembly defining a proximal end of the safety rail, a distal end post assembly defining a distal end of the safety rail, and a plurality of intermediate posts, each defining a first aperture and a second aperture. A cable passes through the first aperture of each of the plurality of intermediate posts and is coupled to the proximal end post assembly and the distal end post assembly. A cable reel is configured to spool and unspool the cable. The proximal end post assembly, the distal end post assembly, and the plurality of intermediate posts are configured for insertion into pockets defined along a perimeter of the flatbed trailer. Some embodiments include a storage frame, the proximal end post being a member of the storage frame, and a cable reel being mounted to the storage frame.

In some embodiments, the cable reel is mounted to the proximal end post. The storage frame may include panels that form an enclosure, the cable reel being mounted to the panels. In some embodiments, the storage frame includes an upper channel and a lower channel, each extending distally relative to the proximal end post, the upper channel and the lower channel being configured to receive the plurality of intermediate posts and the distal end post assembly when the safety rail is in the stowed configuration. In some embodiments, a foot supports the storage frame, the foot depending from the storage frame and being configured for selective positioning along a lower edge of the storage frame. The foot may be configured for insertion into one of the pockets defined along the perimeter of the flatbed trailer. In some embodiments, each of the plurality of posts defines a first passage and a second passage that passes therethrough to define the first aperture and the second aperture.

Some embodiments include a cable lock for selectively locking the cable to stop spooling of the cable and fixing a length of unspooled cable. A cable ratchet may be coupled to the cable for tightening the cable. The cable ratchet may be coupled to an unspooled end of the cable. In some embodiments, the cable passes sequentially through the first aperture of each intermediate posts and the distal end post assembly, and sequentially thorough the second aperture of the distal end post assembly and each of the intermediate posts. The distal end post assembly may include at least one pulley to route the cable from the first aperture of the distal end post assembly to the second aperture of the distal end post assembly.

In some embodiments, the cable reel is self-winding for automatic spooling of the cable when the safety rail is stowed from a deployed configuration to a stowed configuration. The cable reel may include a catch that holds the cable reel in a rotational orientation to maintain the cable in tension between the proximal end post and the distal end post assembly when the safety rail is in a deployed configuration along the flatbed trailer, the catch being releasable to enable unspooling of the cable when the safety rail is deployed from a stowed configuration to the deployed configuration.

In some embodiments, a second cable passes through the second aperture of each of the plurality of intermediate posts and is coupled to the proximal end post assembly and the distal end post assembly, with a second cable reel configured to spool and unspool the second cable. The second cable reel may be mounted to the proximal end post.

Various embodiments of the disclosure include a method for installing a safety rail system on a flatbed trailer, comprising: providing a safety rail system; and providing operating instructions on a tangible, non-transitory medium, the operating instructions including: inserting a proximal end post assembly of the safety rail system into a first side pocket of the flatbed trailer; inserting a distal end post assembly of the safety rail system into a second side pocket of the flatbed trailer; and tightening a cable that is coupled to the proximal end post assembly and the distal end post assembly. The operating instructions may include inserting an intermediate post of the safety rail system into an intermediate side pocket, the intermediate side pocket being located between the first side pocket and the second side pocket. In some embodiments, the operating instructions include removing the intermediate post from a storage frame of the safety rail system prior to the step of inserting the intermediate post in the intermediate side pocket. In some embodiments, the operating instructions include: stowing the intermediate post in a storage frame of the safety rail system; securing the intermediate post within the storage frame by tightening the cable with a cable reel; and removing the proximal end post assembly from the first side pocket.

In some embodiments, the operating instructions include inserting a foot of the safety rail system into a side pocket that is proximate the first side pocket. The operating instructions may include adjusting a position of the foot relative to the proximal end post on the safety rail system to align with the side pocket.

In some embodiments, the operating instructions include: releasing the cable from a cable reel of the safety rail system prior to the step of inserting the distal end post assembly; and tightening the cable with the cable reel during the step of tightening the cable. The operating instructions may also include: stowing the distal end post assembly in a storage frame of the safety rail system; securing the distal end post assembly within the storage frame by tightening the cable with the cable reel; and removing the proximal end post assembly from the first side pocket.

In some embodiments, the operating instructions include removing the distal end post from a frame of the safety rail system prior to the step of inserting the distal end post assembly. The operating instructions may include: loosening the cable that is coupled to the proximal end post assembly and the distal end post assembly; and removing distal end post assembly from the second side pocket of the flatbed trailer. In some embodiments, the operating instructions include stowing the distal end post assembly in a storage frame of the safety rail system.

BRIEF DESCRIPTION OF THE DRAWINGS

FIG. 2 is a perspective view of a deployed safety rail system of FIG. 1 in isolation according to an embodiment of the disclosure;

FIG. 3 is a side elevational view of the deployed safety rail system of FIG. 2 according to an embodiment of the disclosure;

FIG. 4 depicts side and end views of a core post assembly according to an embodiment of the disclosure;

FIG. 5 is a perspective view a base portion of a post assembly according to an embodiment of the disclosure;

FIG. 6 depicts perspective views of a near post assembly, an intermediate post assembly, and a distal end post assembly according to an embodiment of the disclosure;

FIG. 7 is a perspective view of the base portion of the post assembly of FIG. 5 installed in a side pocket according to an embodiment of the disclosure;

FIG. 8 is a partial perspective view of the post assemblies of FIG. 6 in a deployed configuration with cables extending therethrough according to an embodiment of the disclosure;

FIG. 26 is a perspective view of a cable lock assembly according to an embodiment of the disclosure;

FIG. 27 is a sectional view of a cable in a locked configuration at plane XXVII-XXVII of FIG. 31 according to an embodiment of the disclosure;

FIG. 28 is a partial elevational view of the cable lock assembly of FIG. 26 in an unlocked configuration according to an embodiment of the disclosure;

FIG. 29 is a sectional view of a cable chuck at plane XXIX-XXIX of FIG. 28 according to an embodiment of the disclosure;

FIG. 30 is a partial elevational view of the cable lock assembly of FIG. 26 in a locked configuration according to an embodiment of the disclosure; and FIG. 31 is a sectional view of the cable chuck at plane XXXI-XXXI of FIG. 30 according to an embodiment of the disclosure.

DETAILED DESCRIPTION OF THE FIGURES

Figure 1:
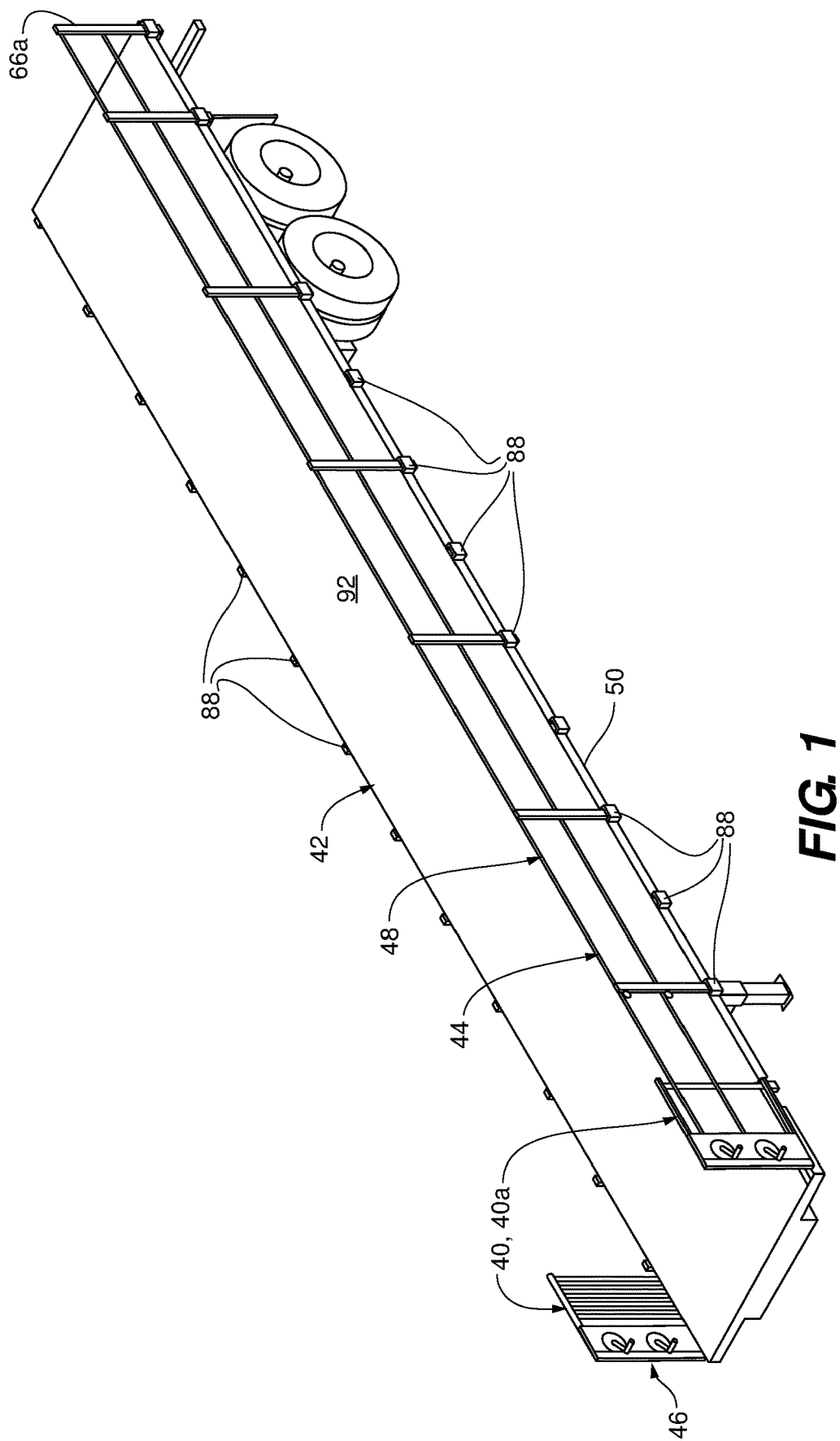
FIG. 1 is a perspective view of a flatbed trailer with deployed and retracted safety rail systems according to an embodiment of the disclosure.

Referring to FIG. 1, safety rail systems 40a installed on a flatbed trailer 42 are depicted according to an embodiment of the disclosure. The safety rail systems 40a are depicted in an extended or deployed configuration 44 and in a retracted or stowed configuration 46. In the deployed configuration 44, the safety rail system 40a provides a safety railing 48 that extends along a perimeter 50 of the flatbed trailer 42.

Referring to FIGS. 2 and 3, the safety rail system 40a is depicted in isolation in the deployed configuration 44 according to an embodiment of the disclosure. The safety rail system 40a includes a proximal end post assembly 62 defining a proximal end 64 of the safety rail 48, a distal end post assembly 66a defining a distal end 68 of the safety rail 48, and a plurality of intermediate post assemblies 72. Of the intermediate post assemblies 72, a near post assembly 74 may be designated, the near post assembly 74 being the intermediate post assembly that is nearest the proximal end post assembly 62. Each of the distal end and intermediate post assemblies 66a, 72 defines a pair of apertures 82a and 82b, referred to collectively or generically as aperture(s) 82. (FIG. 4). A pair of cables 84a and 84b pass through the respective apertures 82, the cables 84a and 84b being referred to collectively or generically as cable(s) 84. The cables 84 are is coupled to the proximal end post 62 and the distal end post 66a. A pair of reels 86a and 86b, referred to collectively or generically as reel(s) 86, are configured to spool and unspool the cables 84. Each of the proximal end post assembly 62, the distal end post assembly 66a, and the plurality of intermediate post assemblies 72 are configured for insertion into side pockets 88 defined along the perimeter 50 of the flatbed trailer 42. The side pockets 88 may be defined by brackets 96 that extend laterally from a flooring 92 (depicted), or may be defined within the flooring 92 proximate an edge 94 of the flatbed trailer 42.

In the deployed configuration 44, cable 84a establishes an upper railing 98a, akin to a hand railing, and cable 84b establishes a lower railing 98b. While the safety rail systems depicted herein define two railings in the deployed configuration 44, systems are contemplated that define a single railing or more than two railings.

Figure 11:
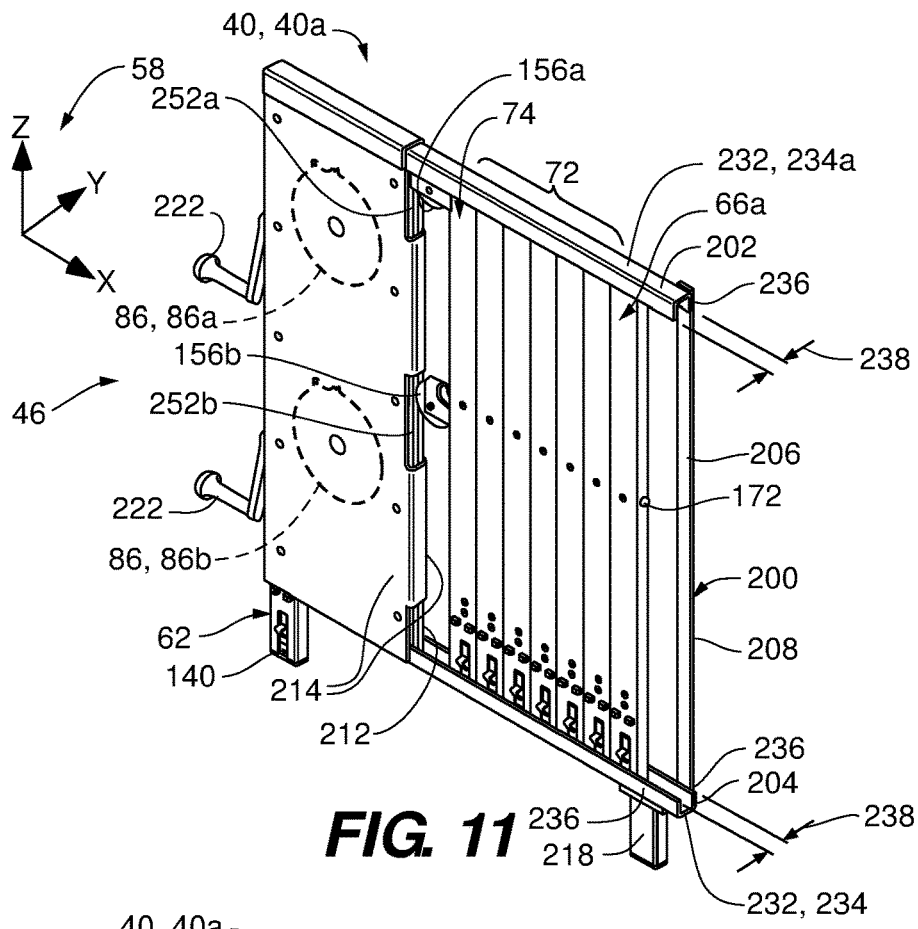
FIG. 11 is a perspective view of the safety rail system of FIG. 9 in the stowed configuration according to an embodiment of the disclosure.
Figure 12:
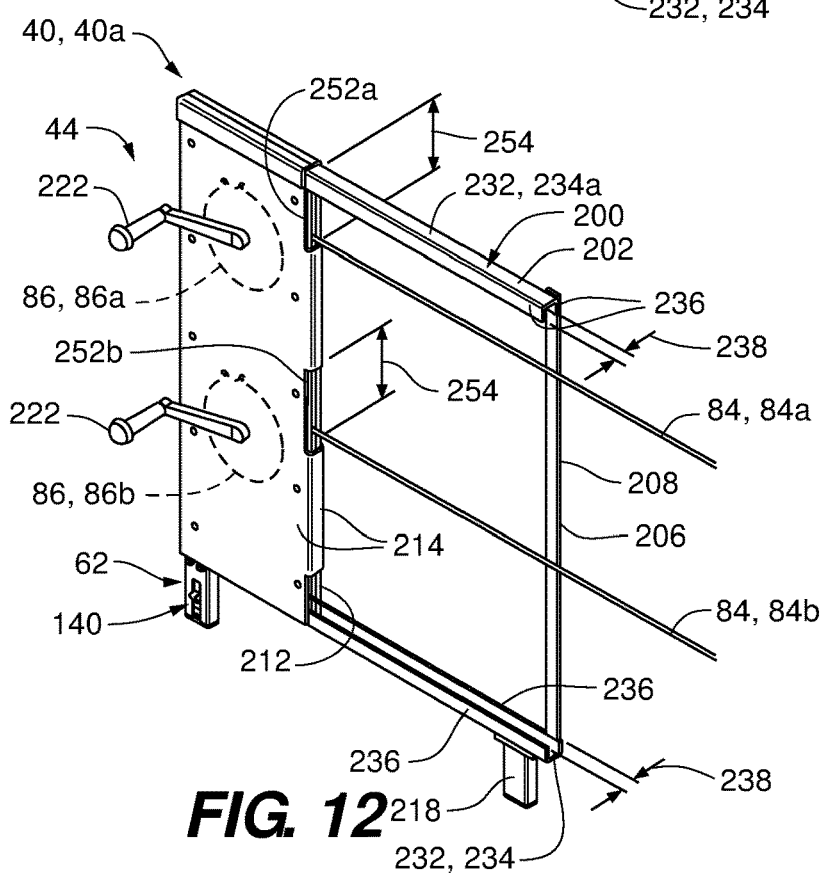
FIG. 12 is a perspective view of the storage frame of the safety rail system of FIG. 11 in a deployed configuration according to an embodiment of the disclosure.

Herein, "proximal" refers to a direction that is generally in the negative x-direction of a Cartesian coordinate system 58 of the safety rail system 40a, and "distal" refers to a direction that is generally in the positive x-direction of the Cartesian coordinate system 58 (FIGS. 2 and 11). As such, "proximal" refers generally to a direction in which the safety rail system 40a is retracted, and "distal" refers generally to an opposite direction, or to a direction in which the safety rail system 40a is deployed. Importantly, proximal and distal do not refer to a direction related to the flatbed trailer 42. Accordingly, the safety rail system 40a may be mounted at any point and extend in any direction on the flatbed trailer 42.

Referring to FIGS. 4 through 6, the post assemblies 66a, 72, and 74 are depicted according to embodiments of the disclosure. In some embodiments, a core post assembly 100 includes a post body 102 having a top portion 104, an intermediate portion 106, and a base portion 108. The core post assembly 100 is so-named because it is common to the post assemblies 66a, 72, and 74. The top portion 104 and base portion 108 may be fitted with caps 122. In some embodiments, the apertures 82 take the form of through-passages 124 that pass through the post body 102. Alternatively, the apertures 82 do not pass through the post body 102, but are defined by structure (not depicted) that extends from the post body 102, such as a loop, eyelet, or channel. In some embodiments, the post body 102 is a rectangular tube 126, closed off on the top end by the cap 122 and including cable slides 128 that define the through-passages 124. The cable slides 128 may be of a polymeric material.

In some embodiments, the base portion 108 includes a post securing mechanism 140 for securing the post assemblies 62, 66a, and 72 within the side pockets 88. The post securing mechanism may include protrusions 142 that project from a lateral face 144 of the post body 102. Opposing protrusions (not depicted) may extend on an opposing side of the post assemblies 62, 66a, and 72. In some embodiments, a retractable clip 146 is housed in a slot 148 that is formed in the base portion 108. The retractable clip 146 may include a ramped lead in 152 and may be spring loaded.

The retractable clip 146 and the protrusions 142 cooperate to define a depth dimension 154. The depth of the side pockets 88 can vary. Accordingly, in some embodiments, the retractable clip 146 may be adjusted within the slot 148 to vary the depth dimension 154. For the safety rail system 40a, the intermediate post assemblies 72 and the distal end post assembly 66a comprise the core post assembly 100, with the near post assembly 74 being modified to include upper and lower guide pulleys 156a and 156b. The proximal post assembly 62 may also include the post securing mechanism 140.

Referring to FIG. 7, operation of the base portions 108 of the post assemblies 62, 66a, and 72 are depicted according to embodiments of the disclosure. The base portion 108 is inserted into the side pocket 88. The ramped lead in 152 causes the retractable clip 146 to be depressed into the base portion 108 of the post body 102 as the retractable clip 146 passes through the side pocket 88. The spring loading causes the retractable clip 146 to extend laterally outward underneath the side pocket 88 once the retractable clip 146 extends below the side pocket 88 to capture the structure defining the side pocket 88 (e.g., bracket 96) between the retractable clip 146 and the protrusions 142 of the post securing mechanism 140. Accordingly, the protrusions 142 rest on and bear against the structure of the side pocket 88 to support the post assemblies 62, 66a, and 72, preventing the post assemblies 62, 66a, and 72 from sliding down or through the side pockets 88 and establishing the vertical height of the post assemblies 62, 66a, and 72. To remove the post assembly 62, 66a, 72, the retractable clip 146 is manually depressed into the base portion 108 and the post assembly 62, 66a, 72 lifted out of the side pocket 88.

Referring to FIG. 8, the top and intermediate portions 104, 106 of the near, intermediate, and distal post assemblies 74, 72, and 66a are depicted in the deployed configuration 44 according to embodiments of the disclosure. The cables 84 pass through the apertures 82 with sufficient clearance to enable cables 84 to slide freely within the post assemblies 74, 72, and 66a, or alternatively to enable the post assemblies 74, 72, and 66a to slide over and along the cables. A termination 172 is disposed at a distal end 174 of each cable 84a and 84b, the termination 172 defining an outer dimension 176 that is greater than the diameter of the apertures 82.

Referring to FIGS. 9 through 13, a storage frame 200 is depicted according to an embodiment of the disclosure. The storage frame 200 includes an upper channel 202 and a lower channel 204 separated by the proximal end post assembly 62 and a distal upright member 206, each of the channels 202, 204 extending distally relative to the proximal end post assembly 62. The distal upright member 206 may define a distal end 208 of the storage frame 200. The storage frame 200 may also include an intermediate upright 212 disposed between the proximal end post assembly 62 and the distal upright member 206. The storage frame 200 may further include lateral panels 214 that cooperate with the proximal end post 62 and the intermediate upright 212 to form an enclosure 216. In some embodiments, a foot 218 depends from the storage frame 200 and is distal to the proximal end post assembly 62.

Figure 10:
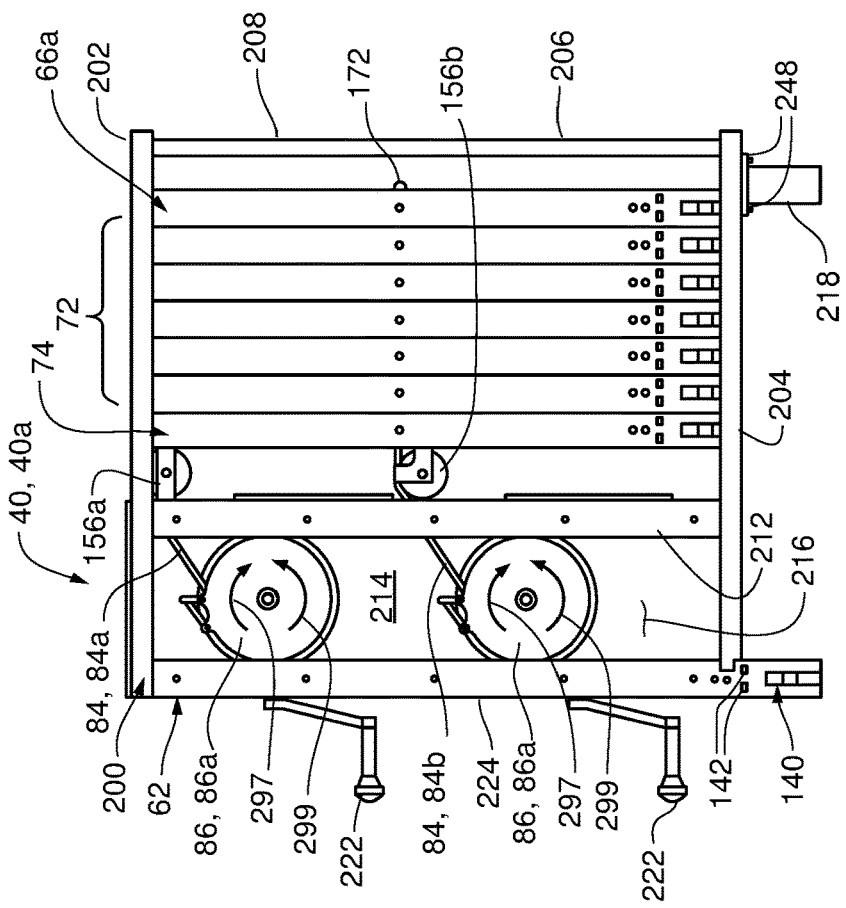
FIG. 10 depicts the side elevational view of FIG. 9 with a cover removed according to an embodiment of the disclosure.
Figure 9:
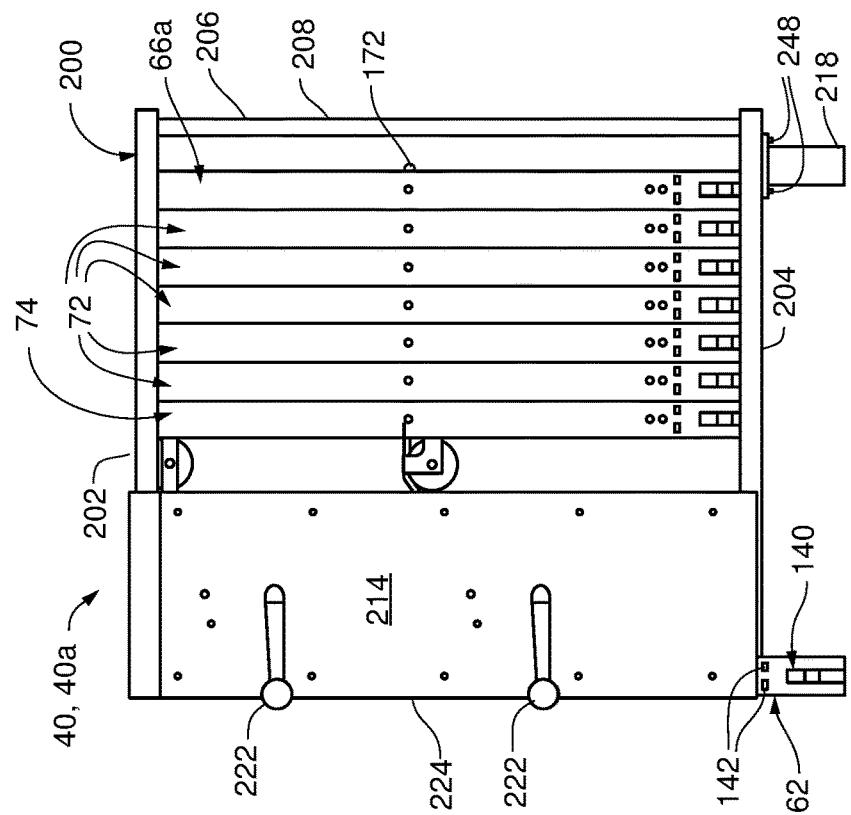
FIG. 9 is a side elevational view of the safety rail system of FIG. 1 in a stowed configuration according to an embodiment of the disclosure.

The cable reels 86 may be mounted to the proximal end post assembly 62, the storage frame 200, or the lateral panels 214 (the latter mounting arrangement being depicted). One or more hand cranks 222 may be included as an accessory to the storage frame 200 for rotating the cable reels 86. While two hand cranks 222 are depicted, it is understood that a single hand crank 222 may be utilized to operate the cable reels 86 in sequence. In some embodiments, a proximal edge 224 of the proximal end post assembly 62 is configured to accept the hand crank(s) 222, such as a feature or receptacle or a combination thereof (not depicted). The hand crank(s) 222 may be disposed at the proximal edge 224 when not in use, and may be arranged in an orientation that is substantially coplanar with the storage frame 200 (FIGS. 10 and 11).

The upper and lower channels 202, 204 are oriented and configured to receive the plurality of intermediate posts 72 and the distal end post 66a when the safety rail system 40a is in the stowed configuration 46. Web portions 232 of the upper channel 202 and the lower channel 204 are oriented to define an upper edge 234a and a lower edge 234b, respectively, of the storage frame 200. Flanges 236 of each channel 202, 204 define a lateral spacing 238 that enables the post assemblies 66a, 72 to slide proximally and distally within the storage frame 200 for easy stowing and deployment. The distal upright member 206 may be offset to one side of the channels 202, 204, so that the channels 202, 204 are open at the distal end 208 of the storage frame 200 to receive the post assemblies 66a, 72. The distal upright member 206 may be offset to one side of the channels 202, 204, so that the channels 202, 204 are open at a distal end 208 of the storage frame 200.

Figure 13:
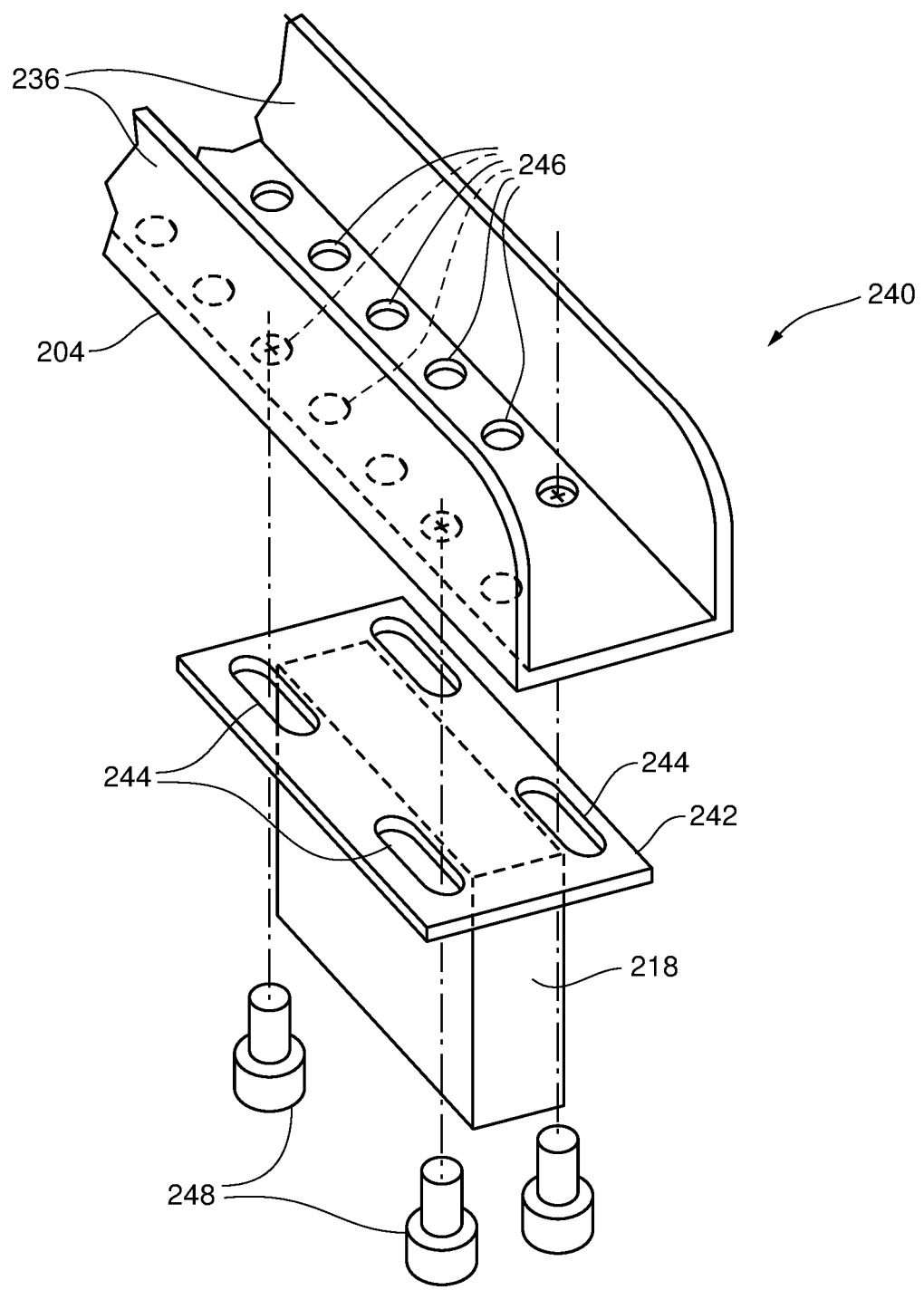
FIG. 13 is a partial perspective view of a foot adjustment assembly for the safety rail systems according to an embodiment of the disclosure.
Figure 17:
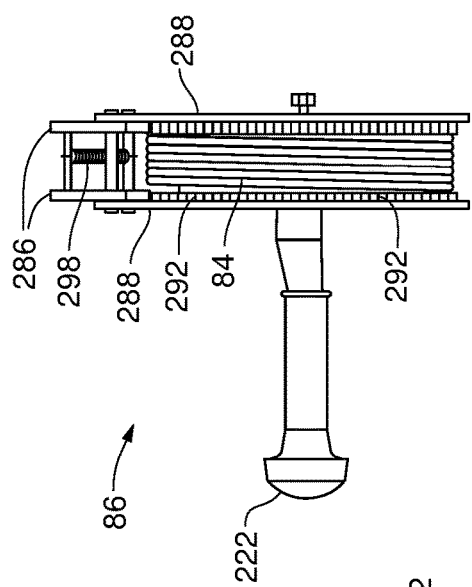
FIG. 17 is a front elevational view of the cable reel of FIG. 14 according to an embodiment of the disclosure.
Figure 18:
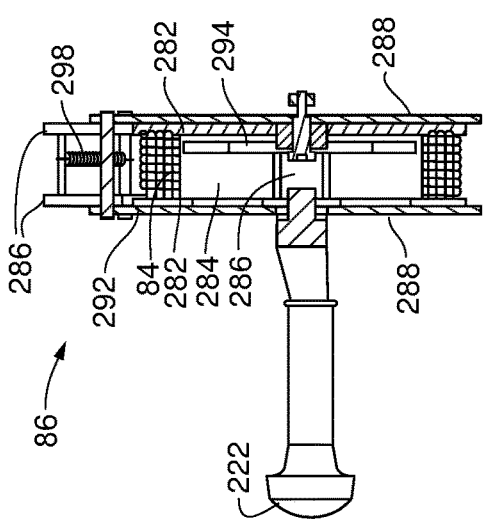
FIG. 18 is a front elevational sectional view of the cable reel of FIG. 16 at sectional plane XVIII-XVIII according to an embodiment of the disclosure.
Figure 14:
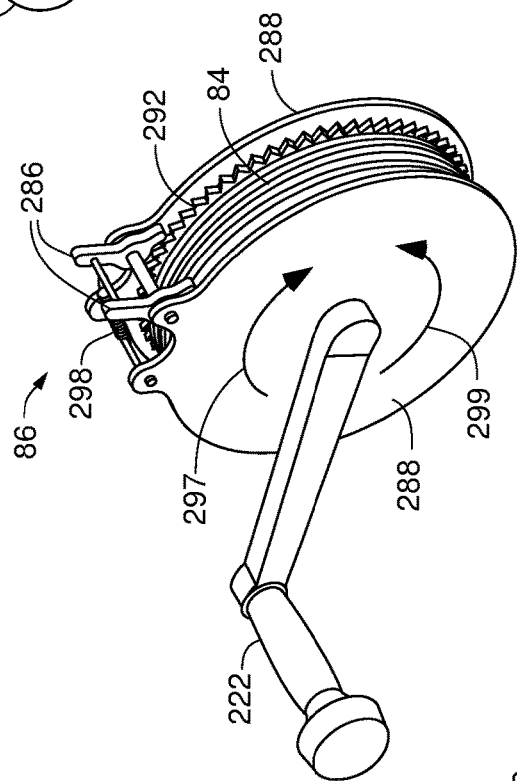
FIG. 14 is a perspective view of a cable reel according to an embodiment of the disclosure.
Figure 15:
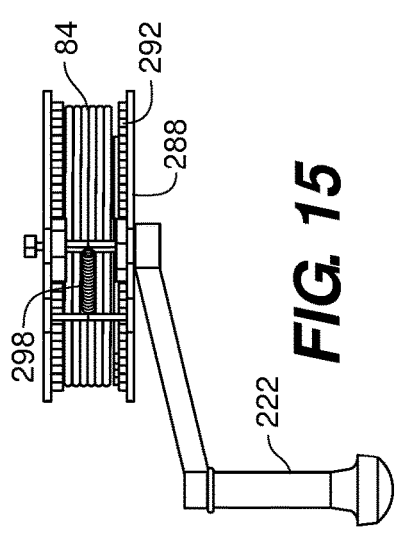
FIG. 15 is a top view of the cable reel of FIG. 14 according to an embodiment of the disclosure.
Figure 16:
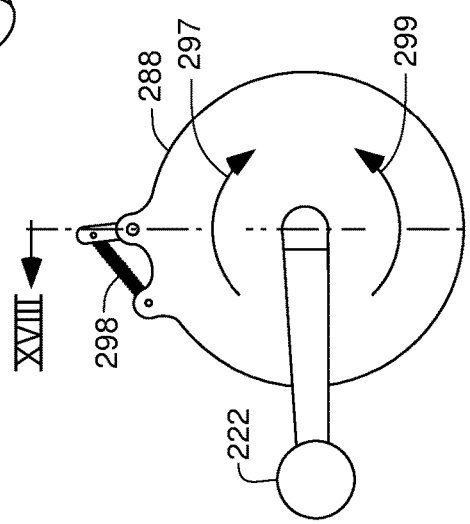
FIG. 16 is a side elevational view of the cable reel of FIG. 14 according to an embodiment of the disclosure.
Figure 19:
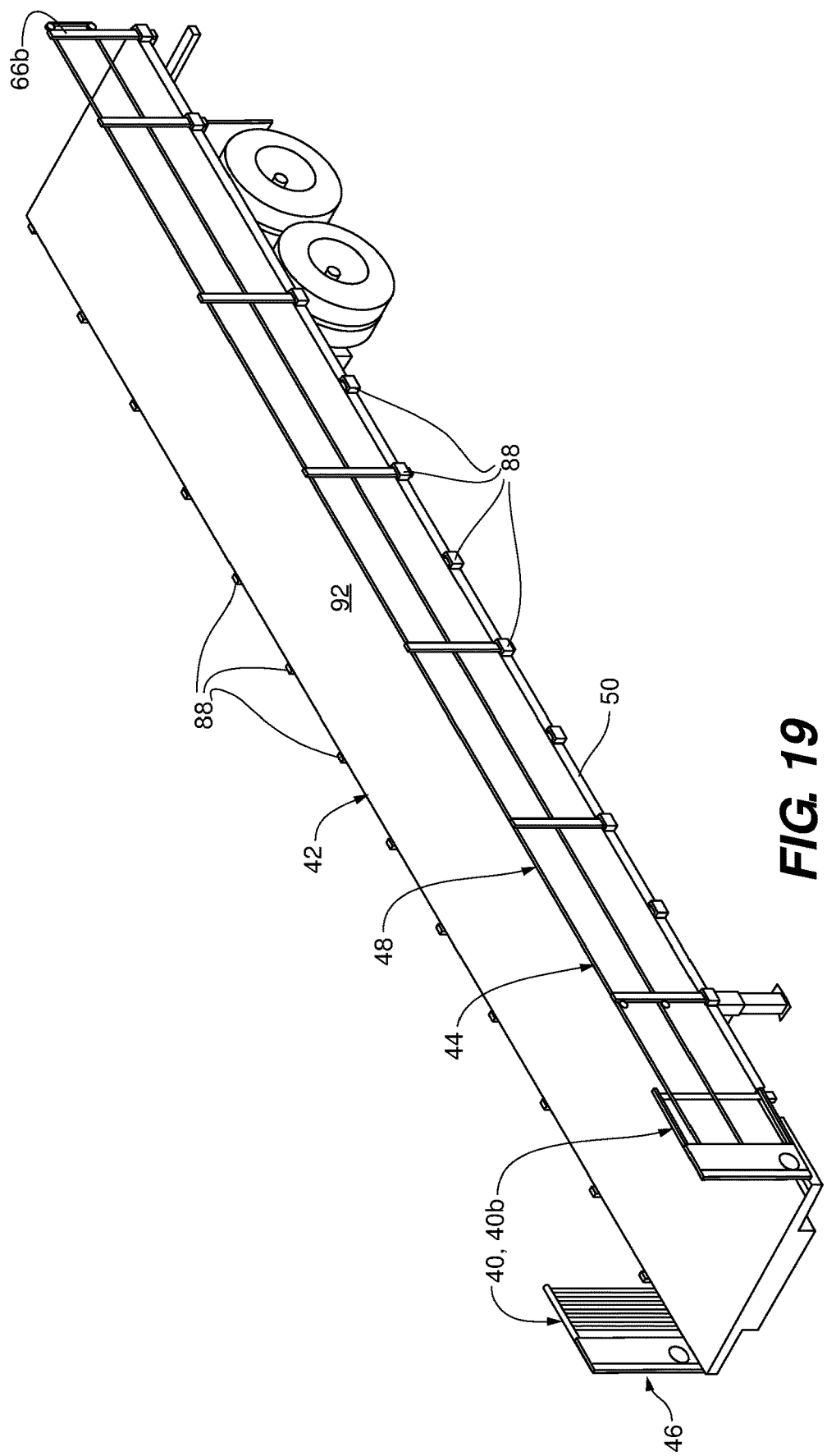
FIG. 19 is a perspective view of a flatbed trailer with a deployed and retracted safety rail systems according to an embodiment of the disclosure.

The foot 218 may be dimensioned for insertion into one of the plurality of side pockets 88. The foot 218 and lower channel 204 may be configured as a foot adjustment assembly 240 that enable the foot 218 to be positioned selectively along the lower edge 234b of the storage frame 200 (FIG. 13). In some embodiments, the foot adjustment assembly 240 includes a foot mounting plate 242 from which the foot 218 depends, the foot mounting plate defining a plurality of elongate through-slots 244 that extend parallel to the flanges 236 of the lower channel 204. The lower channel 204 may define a plurality tapped holes 246 that that mate with fasteners 248. In some embodiments (not depicted), the foot 218 may be configured with the post securing mechanism 140. In some embodiments, the heads of the fasteners 248 effectively serve as standoffs that extend to a same elevation as the bottoms of the protrusions 142 of the proximal end post assembly 62.

Functionally, the tapped holes 246 of the foot adjustment assembly 240 provide coarse alignment of the foot 218 with a corresponding side pocket 88, while the elongate through-slots 244 provide fine adjustment of the alignment. In one embodiment, the foot 218 with foot mounting plate 242 mounted thereto may be placed in the side pocket 88 and the frame 200 lowered onto the foot mounting plate 242 with the proximal end post assembly 62 disposed in the neighboring side pocket 88. The corresponding tapped holes 246 are aligned over the elongate through-slots 244 and the fasteners 248 threadably engaged with the corresponding tapped holes 246 through the elongate through-slots 244, and the fasteners 248 tightened to secure the alignment of the foot 218 with the side pocket 88.

In some embodiments, the intermediate upright 212 defines a pair of through-slots 252a and 252b through which the cables 84 pass. Each through-slot 252a, 252b is located adjacent a respective cable reel 86 and positioned to enable the respective cable 84 to pass directly to the respective guide pulley 156a, 156b. When the post assemblies 66a, 72, 74 are in the stowed configuration 46, the guide pulleys 156a and 156b are elevated and in closer proximity to the cable reels 86 relative to the deployed configuration 44. Accordingly, the straight line trajectory of the cables 84 define a steeper inclined angle θ in the stowed configuration 46 than in the deployed configuration 44 (FIG. 8). The guide pulleys 156a and 156b function to compensate for the changes in the inclined angle θ, without imposing undue wear on the apertures 82 of the near post assembly 74 or on the cables 84, and also promote smooth operation of the system during deployment and retraction. The through-slots 252a and 252b each define a vertical dimension 254 that accommodates the changes in the direct (straight line) trajectory of the cable 84 therethrough, whether the safety rail system 40a is in the stowed configuration 46 or in the deployed configuration 44. The lateral panels 214 may also be configured to accommodate the variation in the direct trajectory.

Referring to FIGS. 14 through 18, the cable reel 86 is depicted according to an embodiment of the disclosure. The cable reel 86 includes flanges 282 separated by a drum 284 and mounted on a spindle 286, the spindle 286 being supported by fore and aft mounting plates 288. The cable 84 is spooled on the drum 284 between the flanges 282. The drum 284 and flanges 282 are rotated about the spindle 286 and are configured for detachable coupling with the hand crank 222. The flanges 282 include ratchet teeth 292 formed or otherwise disposed at the perimeter of the flanges 282. A recoil spring 294 (FIG. 18) is coupled between the spindle 286 and the drum 284, for example a spiral spring (depicted) disposed inside the drum 284. In some embodiments, the cable reel 86 includes at least one pawl 286 pivotally mounted to the mounting plates 288 for selective engagement with the ratchet teeth 292. The pawl(s) 286 may be biased to engage the ratchet teeth 292, for example with a coil spring 298.

When the pawl(s) 286 are in biased engagement with the ratchet teeth 292, the drum 284 can only rotate in a direction that spools the cable 84. To unspool the cable 84, the pawl(s) 286 are disengaged from the ratchet teeth 292 and the cable 28 pulled in an unspooling direction 297. The action of unspooling the cable 84 rotates the drum 284 and causes the recoil spring 294 to tighten. When the cable 84 is released, the energy stored in the recoil spring 294 rotates the drum 284 in a spooling direction 299 to intake the cable 84 onto the drum 284.

In operation, the storage frame 200 with the safety rail system 40a stowed thereon is positioned on the flatbed 42 with the proximal end post assembly 62 is aligned with a side pocket 88 of the user's choosing. Adjustability of the foot 218 along the lower edge 234b of the storage frame 200 enables the storage frame 200 to accommodate different side pocket spacings. As such, the position of the foot 218 is adjusted as necessary to align with another of the side pockets 88, and the storage frame 200 disposed in the two side pockets 88.

To deploy the safety rail 48, the pawl(s) 286 are disengaged from the ratchet teeth 292 on the respective cable reels 86, enabling the distal end post assembly 66a to be pulled out of and extended distally from the storage frame 200. As the distal end post assembly 66a is removed and extended, the cables 84 are unspooled from the cable reels 86. The end post assembly 66a is positioned at and inserted in a side pocket 88 of the user's choosing, away from the storage frame 200. Additional intermediate post assemblies are removed sequentially and may be slid along the cables 84 for insertion into interim side pockets 88 located between the storage frame 200 and the end post assembly 66a on the flatbed trailer 42. When present, the cable slides 128 facilitate the sliding of cables 84 within the apertures 82 when the cables 84 are extended, as well as the sliding of the intermediate post assemblies 72 along the cables 84. Also, during the installation of the post assemblies 62, 66a, 72, the vertical position of the retractable clip 146 may be adjusted on each of the post assemblies 62, 66a, 72 to accommodate the depth dimension 154 of the side pockets 88.

Once the distal end post assembly 66a and the desired number of intermediate post assemblies 72 are mounted to the side pockets 88, the cables 84 may be tightened. For the safety rail system 40a, the cables 84 are tightened by enabling the biased engagement of the pawl(s) 286 with the ratchet teeth 292 of the cable reels 86 and cranking the cable reels 86 in the spooling direction 299 with the hand crank(s) 222. The terminations 172 at the distal ends 174 of the cables 84 prevent the cables 84 from sliding through the distal post assembly 66a, and enables a tension force to be applied on the cables 84 that is countered by the distal post assembly 66a. The pawl(s) 286 prevent the cable reels 86 from reversing under the tension imposed by the cables 84, so that the cables 84 are drawn taut. In the taut state, the safety rail 48 provides a firm, reliable barrier that prevents personnel and large objects from falling off the perimeter 50 of the flatbed trailer 42.

To retract the safety rail system 40a, the pawl(s) 286 may be disengaged from the ratchet teeth 292 on the respective cable reels 86, enabling the cable reels 86 to rotate in the unspooling direction 297 and slacken cables 84 relative to the taut state. The intermediate post assemblies 72 and the distal end post assembly 66a are removed from their respective side pockets 88. In embodiments where the post assemblies 66a, 72 are equipped with post securing mechanisms 140 and act to secure the post assemblies 66a, 72 within the side pockets 88, each post assembly 66a, 72 is removed by manually depressing the retractable clip 146 into the base portion 108 to enable the intermediate post assembly 72 to be lifted out of the side pocket 88.

In safety rail systems 40a that utilize the recoil spring 294, the spring 294 is tightened during the deployment of the safety rail system 40a. The energy stored in the recoil spring 294 may maintain a degree of tension on the cables 84 after the pawl(s) 286 are released. When the user removes the distal end post assembly 66a from its respective side pocket and advances the distal end post assembly 66a toward the storage frame 200, energy stored in the recoil spring 294 may cause the drum 284 to spool, thus drawing the cable 84 onto the cable reel 86. Alternatively or in addition, the cables 84 may be spooled onto cable reels 86 with the hand crank(s) 222.

During the spooling of the cables 84, those post assemblies 66a, 72, 74 that were deployed are gathered and inserted through the open ends of the upper and lower channels 202, 204 and horizontally stacked therein. The caps 122 at the ends of the post assemblies 66a, 72, 74 not only cover the edges at the ends of the top and bottom portions 104 and 108, but may also be made of a material (e.g., polymer) that facilitates sliding of the post assemblies 66a, 72, 74 within the channels 202, 204, by enabling the post assemblies 66a, 72, 74 to slide easily therein. The post assemblies 66a, 72, 74 may be secured by enabling the biased engagement of the pawl(s) 286 with the ratchet teeth 292 of the cable reels 86 and cranking the cable reels 86 in the spooling direction 299 with the hand crank(s) 222. In this way, the cables 84 exert a compressive force that causes the stacked post assemblies 66*a*, 72, 74 to register against each other and to form a stable, compact horizontal stack. The engagement of the pawl(s) 286 maintain the tension on the cables 84 to secure the post assemblies 66*a*, 72, 74 within the storage frame 200 in the stowed configuration 46.

Once the post assemblies 66*a*, 72, 74 are secured within the storage frame 200, the hand crank(s) 222 may be stowed at the proximal edge 224 of the storage frame 200. The storage frame 200 may be left in place or removed from its respective side pockets 88. The storage frame 200 in the stowed configuration 46 includes all of the appurtenances required for a future installation in a flat, compact package that is amenable to remote storage and stacking with other safety rail systems 40*a*.

Referring to FIGS. 19 through 25, a safety rail system 40*b* is depicted according to an embodiment of the disclosure. The safety rail system 40*b* includes many of the same components and attributes as safety rail system 40*a*, which are indicated with same-labeled reference characters. One distinction of the safety rail system 40*b* is a single reel 86*c* and modifications to accommodate the single reel 86*c* and a single cable 84. Herein, while the single reel 86*c*, along with reels 86*a* and 86*b*, are referred to generically and collectively as reel(s) 86, the single reel 86*c* is distinguishable from reels 86*a* and 86*b* in the depicted embodiment of safety rail system 40*b*. The single reel 86*c* may rely solely on self-recoiling to spool the cable 84, thus requiring no crank or crank access accommodation for the single reel 86*c*. The recoiling mechanism of the single reel 86*c* may be the same as the recoil mechanism for the reels 86*a* and 86*b*. In some embodiments, the recoiling mechanism for the single reel 86*c* places a continuous tension on the cable 84. Accordingly, in some embodiments, the single reel 86 has no need for the ratchet mechanism (i.e., ratchet teeth 292 and pawl(s) 286) of reels 86*a* and 86*b*). Optionally, and not depicted, the single reel may be identical to the reels 86*a* and 86*b*, with possible modification to accommodate more cabling in the stowed configuration.

Figure 21:
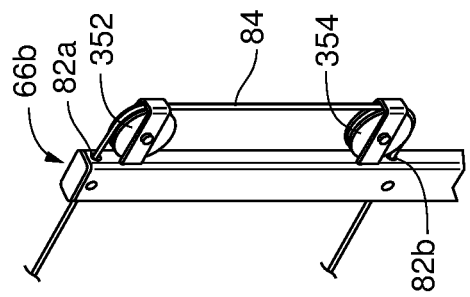
FIG. 21 is a partial perspective view of the distal end post assembly of the safety rail system of FIG. 19 according to an embodiment of the disclosure.
Figure 20:
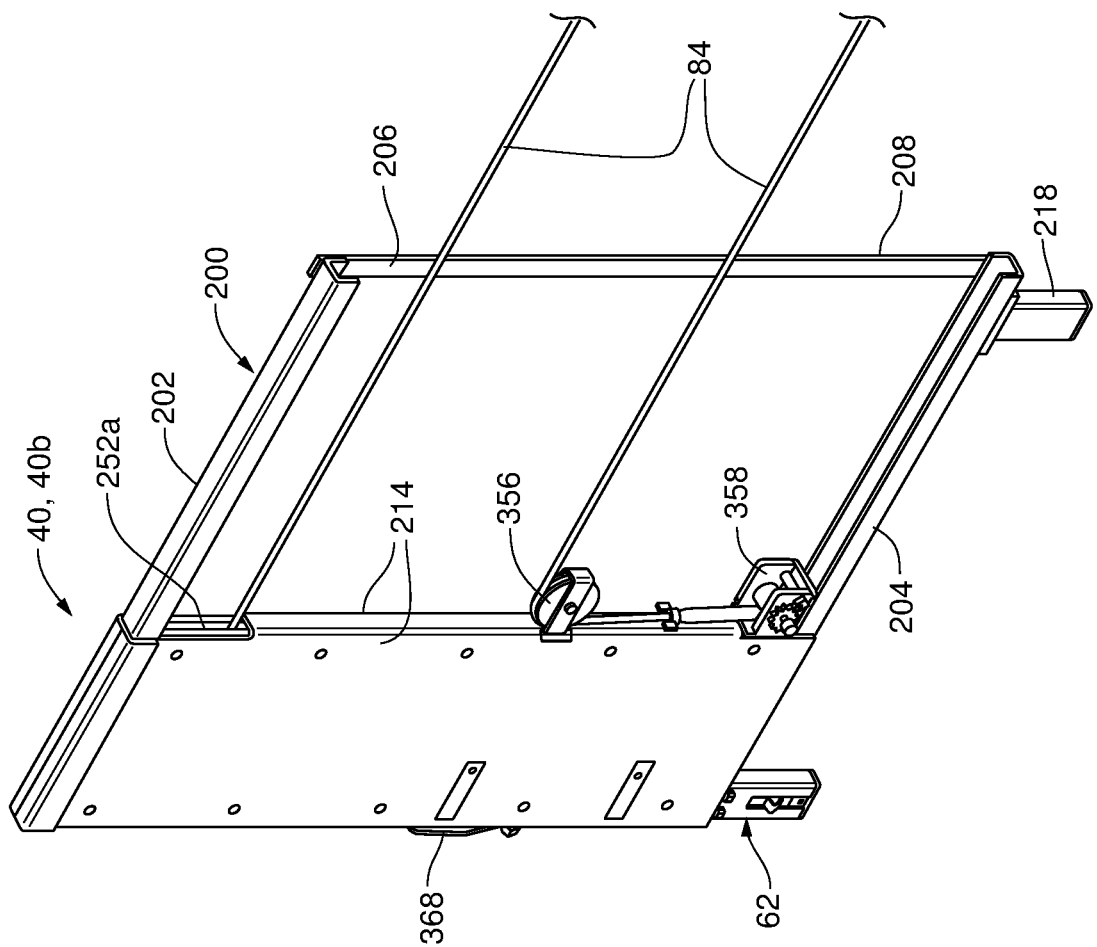
FIG. 20 is a perspective view of a storage frame of the safety rail system of FIG. 19 in the deployed configuration according to an embodiment of the disclosure.
Figure 23:
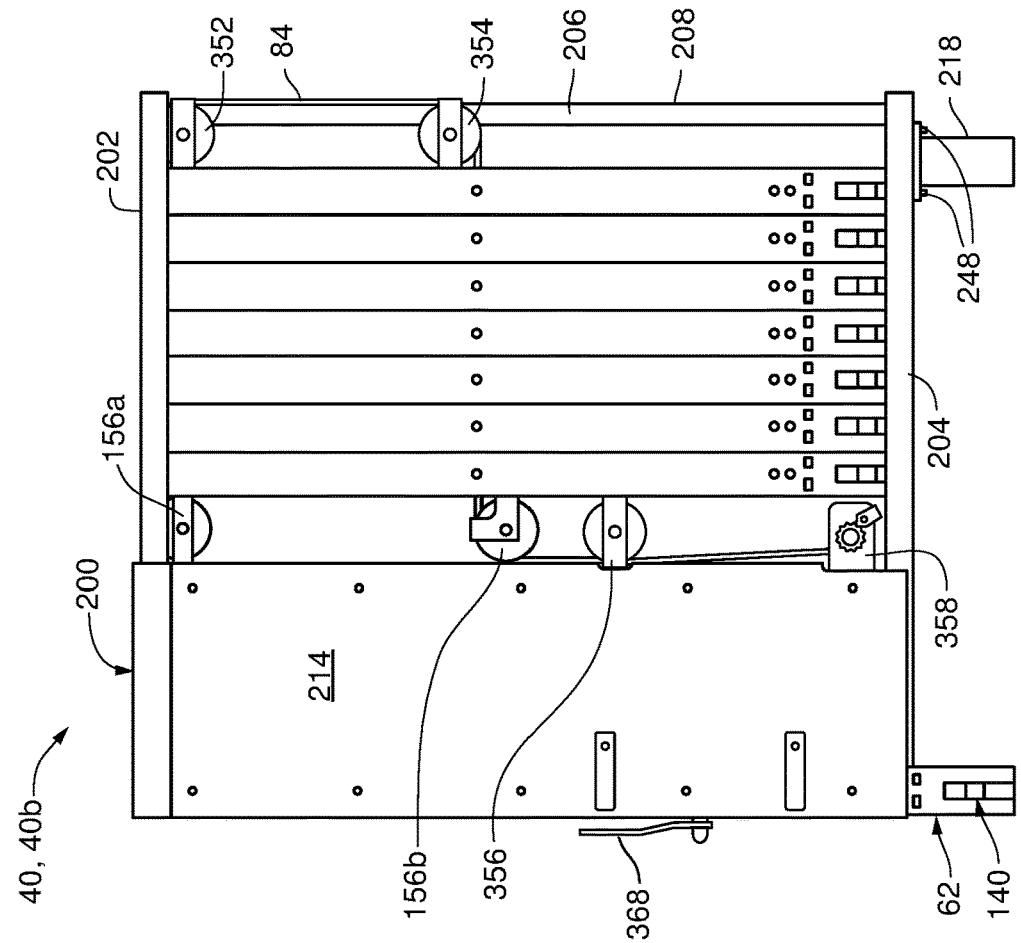
FIG. 23 is a side elevational view of the safety rail system of FIG. 19 in a stowed configuration according to an embodiment of the disclosure.
Figure 22:
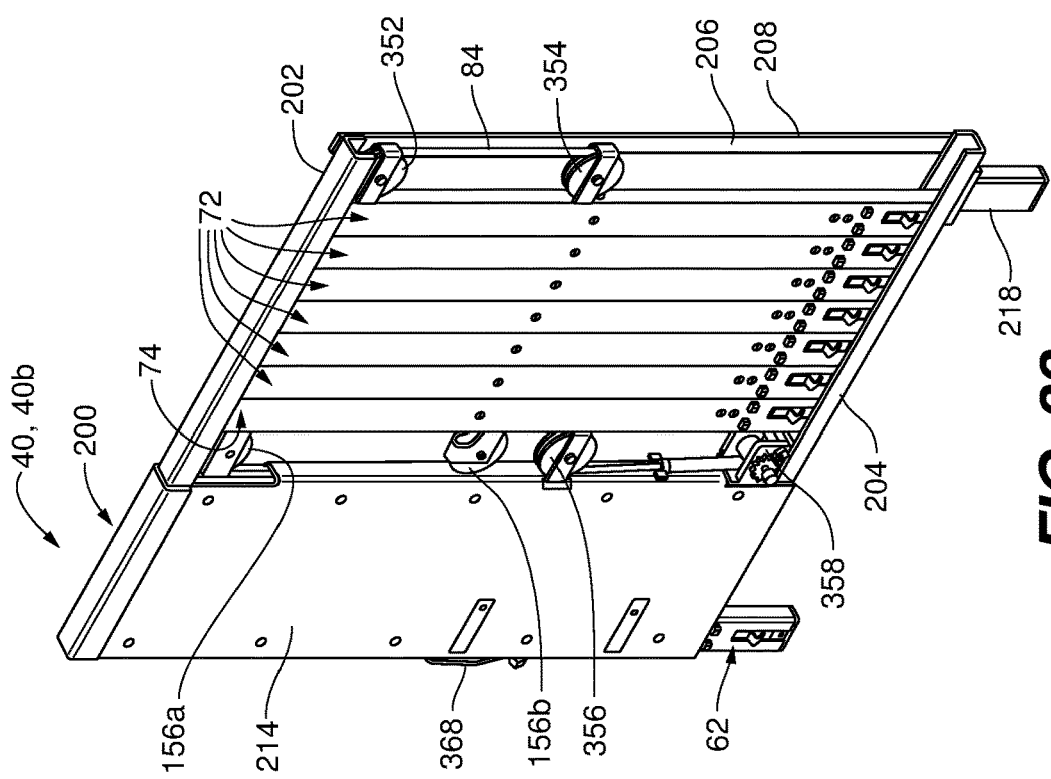
FIG. 22 is a perspective view of the safety rail system of FIG. 19 in the stowed configuration according to an embodiment of the disclosure.
Figure 25:
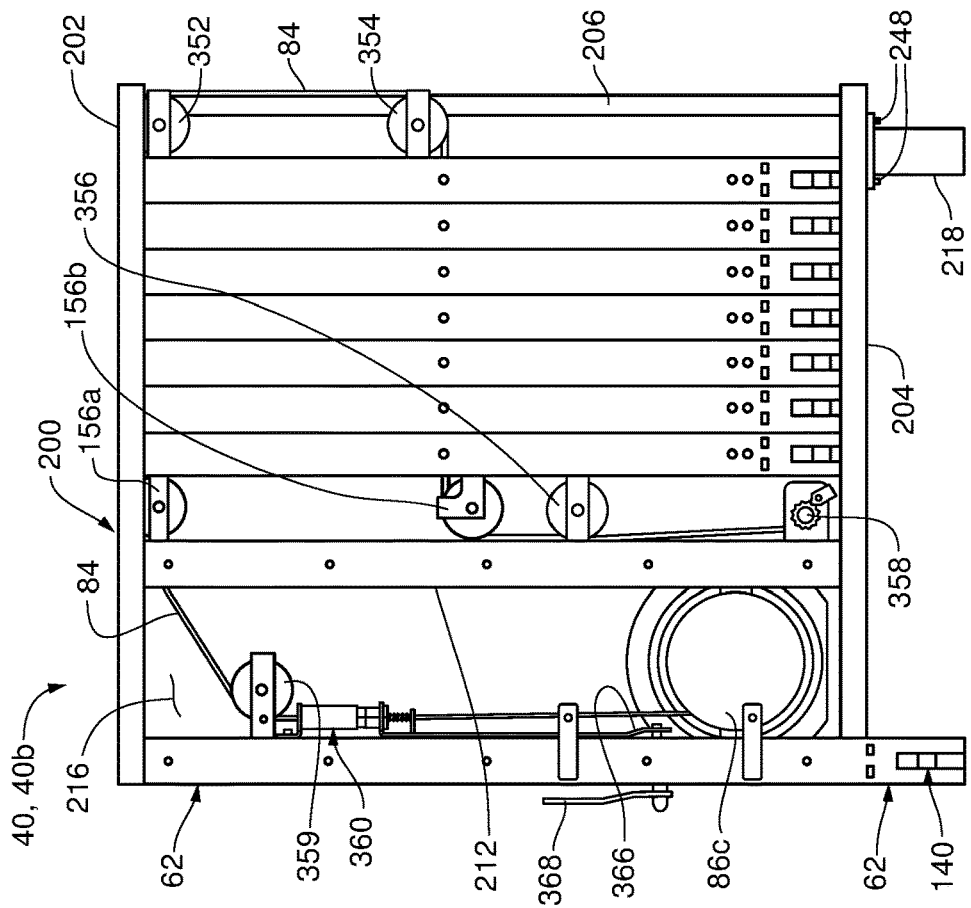
FIG. 25 depicts the side elevational view of FIG. 24 with a cover removed according to an embodiment of the disclosure.
Figure 24:
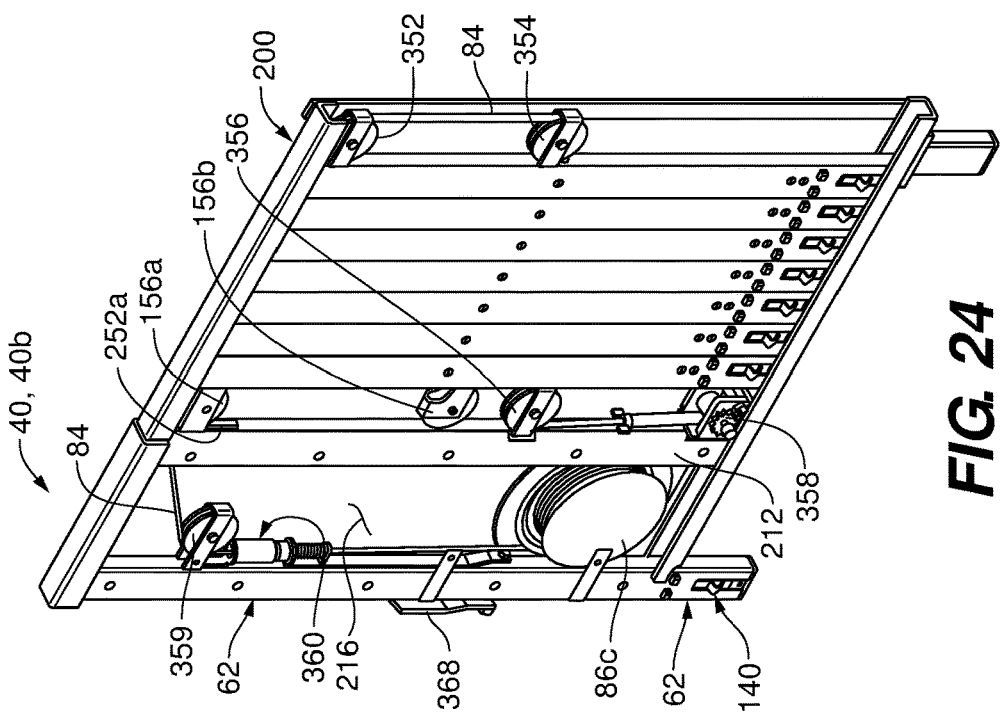
FIG. 24 depicts the perspective view of FIG. 22 with a cover removed according to an embodiment of the disclosure.

To accommodate the use of a single cable 84, a distal end post assembly 66*b* is equipped with an upper pulley 352 and a lower pulley 354 for routing the cable 84 (FIG. 21). Other components and attributes of the distal end post assembly 66*b* are the same as distal end post assembly 66*a*, which are indicated with same-labeled reference characters. The cable 84 is routed through the apertures 82*a* of the intermediate post assemblies 72 as depicted in FIG. 8, through aperture 82*a* of the distal end post assembly 66*b*, over upper pulley 352 and lower pulley 354, and through aperture 84*b* of the distal end post assembly 66*b* to pass back through the apertures 82*b* of the intermediate post assemblies 72. The cable 84 is routed over the guide pulleys 156*a* and 156*b* of the near post assembly 74. In some embodiments, the cable 84 passes over the guide pulley 156*b* and an additional guide pulley 356 and is terminated at a cable or strap ratchet 358. The strap ratchet 356 may be affixed to the lower channel 204, as depicted.

The enclosure 216 of the safety rail system 40*b* houses the single reel 86*c*, a cable lock assembly 360, and a routing pulley 359. The cable lock assembly 360 and routing pulley 359 may be mounted to the proximal end post assembly 62. The cable 84 is routed from the single reel 86*c*, through the cable lock assembly 360, over the routing pulley 359, and out of the enclosure 216 via through-slot 252*a*.

Referring to FIGS. 26 through 31, the cable lock assembly 360 is depicted according to an embodiment of the disclosure. The cable lock assembly 360 includes a cable chuck 362 affixed to a mount 364, an actuation linkage 366 coupled to the cable chuck 362, and an actuation lever 368 (FIG. 25) coupled to the actuation linkage 366. The cable chuck 362 includes a housing 372 that is concentric about a cable path axis 374 along which the cable 84 passes. The cable chuck 362 may include a plurality of jaws 376 disposed in the housing 372 that cooperate to define a passage 378 concentric about the cable path axis 374. An interior wall 380 of the housing 372 defines a frustoconical shape 381, the sloped incline of which is matched by tapered outer surfaces 383 of the jaws 376. The jaws 376 include end portions 382 that protrude from an open end 384 of the housing 372, the end portions 382 cooperating to define a chuck flange 386. The actuation linkage 366 includes a yoke portion 388 and a standoff 392 at a first end 394, the standoff 392 defining an aperture 395 that is concentric about the cable path axis 374. The actuation linkage 366 includes a second end 396 opposite the first end 394 that defines a mounting hole 398 for coupling with the actuation lever 368. The cable lock assembly 360 may further include a spring 399 that is disposed between the cable chuck 362 and the standoff 392.

In assembly, the jaws 376 are inserted into the yoke portion 388 of the actuation linkage 366 so that the chuck flange 386 registers against the yoke portion 388 and the tapered outer surfaces 383 extend beyond the actuation linkage 366. The tapered outer surfaces 383 are disposed in the housing 372 along the cable path axis 374 so that the tapered outer surfaces 383 of the jaws 376 slide along the frustoconical shape 381 of the interior wall 380 of the housing 372. The spring 399 is inserted between the cable chuck 362 and the standoff 392 and aligned to be concentric about the cable path axis 374. The cable 84 is routed through the aperture 395, spring 399, passage 378 of the cable chuck 362, and the housing 372. The mount 364 is affixed to the proximal end post assembly 62 and the second end 396 of the actuation linkage 366 coupled to the actuation lever 368. The cable lock assembly 360 is thereby captured between the mount 364 and the actuation lever 368, preventing the jaws 376 from sliding out of the housing 372.

When the actuation lever 368 is in the unlock configuration, the actuation linkage 366 is pulled away from the cable chuck 362 so that the yoke portion 388 engages the chuck flange 386 to pull the jaws 376 further out of the open end 384 of the housing 372 (FIG. 28). This enables the jaws 376 to disengage from the interior wall 380 of the housing 372. The disengagement effectively expands the diameter of the passage 378 of the cable chuck 362 (FIG. 29), enabling the cable 84 to slide through the passage 378.

When the actuation lever is in the lock configuration, the actuation linkage 366 is pushed toward the cable chuck 362, so that the standoff 392 exerts a compression force on the spring 399 that is transferred to the jaws 376. The jaws 376 are thereby pushed further into the housing (FIG. 30) and into engagement with the frustoconical shape 381 of the interior wall 380. The sliding interaction between the tapered outer surfaces 383 of the jaws 376 and the frustoconical shape 381 forces the jaws 376 together, thus constricting the passage 378 and gripping the cable 84 within the cable chuck 362 (FIG. 31). The spring 399 also compensates the stroke of the actuation linkage 366 to prevent buckling of the linkage 366 once the cable chuck 362 is firmly set.

Operation of the safety rail system 40*b* is as follows. The storage frame 200 with the safety rail system 40*b* stowed thereon is positioned on the flatbed 42 with the proximal end post assembly 62 is aligned with a given side pocket 88 of the user's choosing. Adjustability of the foot 218 along the lower edge 234*b* of the storage frame 200 enables the storage frame 200 to accommodate different side pocket spacing. As such, the position of the foot 218 is adjusted as necessary to align with another of the side pockets 88, and the storage frame 200 disposed in the two side pockets 88.

To deploy the safety rail 48, the actuation lever 368 is set in the unlock position and the distal end post assembly 66b is be pulled out of and extended distally from the storage frame 200. As the distal end post assembly 66b is removed and extended, the cable 84 is unspooled from the cable reel 86c. The cable 84, being terminated on one end at the cable reel 86c and on the other end at the cable ratchet 356 effectively defines a loop that extends through the post assemblies 72, 74, and 66b, the loop being lengthened by the distal extraction of the distal end post assembly 66b. The end post assembly 66b is positioned at and inserted in a side pocket 88 of the user's choosing, away from the storage frame 200. Additional intermediate post assemblies are removed sequentially and may be slid along the cable 84 for insertion into interim side pockets 88 located between the storage frame 200 and the end post assembly 66b on the flatbed trailer 42.

Once the distal end post assembly 66b and the desired number of intermediate post assemblies 72 are mounted to the side pockets 88, the cable 84 may be tightened. For the safety rail system 40b, the cable 84 is tightened by locking the cable chuck (i.e., rotating the actuation lever 368 that actuates the cable lock assembly 360 into the lock position), and taking up excess slack in the cable 84 with the cable ratchet 356. The cable 84 is thus tightened from the cable lock 360 to the cable ratchet 356, enabling a tension force to be applied on the cable 84 that is countered by the distal post assembly 66b. The cable ratchet 356 maintains the cables 84 taut. In the taut state, the safety rail 48 provides a firm, reliable barrier that prevents personnel and large objects from falling off the perimeter 50 of the flatbed trailer 42.

To retract the safety rail system 40b, the cable lock 360 is unlocked, enabling the cable reel 86c to spool the cable 84. The intermediate post assemblies 72 and the distal end post assembly 66b are removed from their respective side pockets 88. In embodiments where the post assemblies 66b, 72 are equipped with post securing mechanisms 140 and act to secure the post assemblies 66b, 72 within the side pockets 88, each post assembly 66b, 72 is removed by manually depressing the retractable clip 146 into the base portion 108 to enable the intermediate post assembly 72 to be lifted out of the side pocket 88.

For safety rail systems 40b, the recoil spring is tightened during the deployment. The energy stored in the recoil spring may maintain a degree of tension on the cables 84 after the cable lock assembly 360 is released. When the user removes the distal end post assembly 66b from its respective side pocket and advances the distal end post assembly 66b toward the storage frame 200, energy stored in the recoil spring may cause the reel 86c to spool, thus drawing the cable 84 onto the cable reel 86c.

During the spooling of the cable 84, those post assemblies 66b, 72, 74 that were deployed are gathered and inserted through the open ends of the upper and lower channels 202, 204 and horizontally stacked therein. The post assemblies 66b, 72, 74 may be secured by locking the cable lock assembly 360 and applying a tension to the cable 84 with the cable ratchet 356. In this way, the cables 84 exert a compressive force that causes the stacked post assemblies 66b, 72, 74 to register against each other and to form a stable, compact horizontal stack. The tension applied by the cable ratchet 356 secures the post assemblies 66b, 72, 74 within the storage frame 200 in the stowed configuration 46. The storage frame 200 may be left in place or removed from its respective side pockets 88. The storage frame 200 in the stowed configuration 46 includes all of the appurtenances required for a future installation in a flat, compact package that is amenable to remote storage and stacking with other safety rail systems 40b.

Various of the steps for operating the safety rail systems 40a and 40b presented herein may be provided on a tangible, non-transitory medium. Non-limiting examples of a tangible, non-transitory medium include a paper document, stickers posted on the safety rail system 40a, 40b, or computer-readable media including compact disc and magnetic storage devices (e.g., hard disk, flash drive, cartridge, floppy drive). The computer-readable media may be provided locally or accessible over the internet. The instructions may be complete on a single medium, or divided among two or more tangible, non-transitory media. For example, the a paper document may instruct the user to access one or more of the operational steps over the internet, the internet-accessible steps being stored on a computer-readable medium or media. The instructions may be in the form of written words, figures, and/or video presentations. Alternatively, the methods may be executed without the aid of instructions.

The discussion and depiction herein focuses on flatbed trailers. It is contemplated that the safety rail system 40a and the principles thereof may be utilized on other devices in need of containment barrier protection, including by not limited to flatbed trucks, barges, railway cars, and loading docks.

Each of the additional figures and methods disclosed herein can be used separately, or in conjunction with other features and methods, to provide improved devices and methods for making and using the same. Therefore, combinations of features and methods disclosed herein may not be necessary to practice the disclosure in its broadest sense and are instead disclosed merely to particularly describe representative and preferred embodiments.

Various modifications to the embodiments may be apparent to one of skill in the art upon reading this disclosure. For example, persons of ordinary skill in the relevant arts will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

Persons of ordinary skill in the relevant arts will recognize that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

Unless indicated otherwise, references to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112(f) are not to be invoked unless the specific terms "means for" or "step for" are recited in the respective claim.

What is claimed is:

1. A safety rail for a flatbed trailer, comprising:
   a proximal end post assembly defining a proximal end of the safety rail;
   a distal end post assembly defining a distal end of the safety rail;
   a plurality of intermediate posts, each defining a first aperture and a second aperture;
   a cable that passes through said first aperture of each of said plurality of intermediate posts and is coupled to said proximal end post assembly and said distal end post assembly; and
   a cable reel configured to spool and unspool said cable,
   wherein said proximal end post assembly, said distal end post assembly, and said plurality of intermediate posts are configured for insertion into pockets defined along a perimeter of the flatbed trailer, and
   wherein said cable reel is mounted to said proximal end post.

2. The safety rail of claim 1, wherein each of said plurality of posts defines a first passage and a second passage that passes therethrough to define said first aperture and said second aperture.

3. The safety rail of claim 1, wherein said cable reel is self-winding for automatic spooling of said cable when the safety rail is stowed from a deployed configuration to a stowed configuration.

4. The safety rail of claim 1, wherein said cable reel includes a catch that holds said cable reel in a rotational orientation to maintain said cable in tension between said proximal end post and said distal end post assembly when the safety rail is in a deployed configuration along the flatbed trailer, said catch being releasable to enable unspooling of said cable when the safety rail is deployed from a stowed configuration to said deployed configuration.

5. A safety rail for a flatbed trailer, comprising:
   a proximal end post assembly defining a proximal end of the safety rail;
   a distal end post assembly defining a distal end of the safety rail;
   a plurality of intermediate posts, each defining a first aperture and a second aperture;
   a cable that passes through said first aperture of each of said plurality of intermediate posts and is coupled to said proximal end post assembly and said distal end post assembly;
   a cable reel configured to spool and unspool said cable; and
   a storage frame, said proximal end post being a member of said storage frame, said cable reel being mounted to said storage frame,
   wherein said proximal end post assembly, said distal end post assembly, and said plurality of intermediate posts are configured for insertion into pockets defined along a perimeter of the flatbed trailer.

6. The safety rail of claim 5, wherein said storage frame includes panels that form an enclosure, said cable reel being mounted to said panels.

7. The safety rail of claim 5, wherein said storage frame includes an upper channel and a lower channel, each extending distally relative to said proximal end post, said upper channel and said lower channel being configured to receive said plurality of intermediate posts and said distal end post assembly when the safety rail is in the stowed configuration.

8. The safety rail of claim 7, comprising a foot for supporting said storage frame, said foot depending from said storage frame and being configured for selective positioning along a lower edge of said storage frame.

9. The safety rail of claim 8, wherein said foot is configured for insertion into one of said pockets defined along said perimeter of the flatbed trailer.

10. A safety rail for a flatbed trailer, comprising:
    a proximal end post assembly defining a proximal end of the safety rail;
    a distal end post assembly defining a distal end of the safety rail;
    a plurality of intermediate posts, each defining a first aperture and a second aperture;
    a cable that passes through said first aperture of each of said plurality of intermediate posts and is coupled to said proximal end post assembly and said distal end post assembly;
    a cable reel configured to spool and unspool said cable;
    a cable lock for selectively locking said cable to stop spooling of said cable and fixing a length of unspooled cable;
    a cable ratchet coupled to said cable for tightening said cable,
    wherein said proximal end post assembly, said distal end post assembly, and said plurality of intermediate posts are configured for insertion into pockets defined along a perimeter of the flatbed trailer, and
    wherein said cable ratchet is coupled to an unspooled end of said cable.

11. A safety rail for a flatbed trailer, comprising:
    a proximal end post assembly defining a proximal end of the safety rail;
    a distal end post assembly defining a distal end of the safety rail;
    a plurality of intermediate posts, each defining a first aperture and a second aperture;
    a cable that passes through said first aperture of each of said plurality of intermediate posts and is coupled to said proximal end post assembly and said distal end post assembly; and
    a cable reel configured to spool and unspool said cable,
    wherein said proximal end post assembly, said distal end post assembly, and said plurality of intermediate posts are configured for insertion into pockets defined along a perimeter of the flatbed trailer, and
    wherein said cable passes sequentially through said first aperture of each intermediate posts and said distal end post assembly, and sequentially thorough said second aperture of said distal end post assembly and each of said intermediate posts.

12. The safety rail of claim 11, wherein said distal end post assembly includes at least one pulley to route said cable from said first aperture of said distal end post assembly to said second aperture of said distal end post assembly.

13. A safety rail for a flatbed trailer, comprising:
    a proximal end post assembly defining a proximal end of the safety rail;

a distal end post assembly defining a distal end of the safety rail;

a plurality of intermediate posts, each defining a first aperture and a second aperture;

a cable that passes through said first aperture of each of said plurality of intermediate posts and is coupled to said proximal end post assembly and said distal end post assembly;

a cable reel configured to spool and unspool said cable, a second cable that passes through said second aperture of each of said plurality of intermediate posts and is coupled to said proximal end post assembly and said distal end post assembly; and a second cable reel configured to spool and unspool said second cable, wherein said proximal end post assembly, said distal end post assembly, and said plurality of intermediate posts are configured for insertion into pockets defined along a perimeter of the flatbed trailer, and wherein said second cable reel is mounted to said proximal end post.

14. A method for installing a safety rail system on a flatbed trailer, comprising:

providing a safety rail system; and providing operating instructions on a tangible, non-transitory medium, said operating instructions including:

inserting a proximal end post assembly of said safety rail system into a first side pocket of the flatbed trailer;

inserting a distal end post assembly of said safety rail system into a second side pocket of the flatbed trailer;

tightening a cable that is coupled to said proximal end post assembly and said distal end post assembly;

inserting an intermediate post of said safety rail system into an intermediate side pocket, said intermediate side pocket being located between said first side pocket and said second side pocket and removing said intermediate post from a storage frame of said safety rail system prior to the step of inserting said intermediate post in said intermediate side pocket.

* * * * *